(12) United States Patent
Lee et al.

(10) Patent No.: US 12,081,277 B2
(45) Date of Patent: Sep. 3, 2024

(54) APPARATUS AND METHOD FOR TRANSMITTING AND RECEIVING SIGNALS IN WIRELESS OPTICAL COMMUNICATION SYSTEM

(71) Applicant: LG ELECTRONICS INC., Seoul (KR)

(72) Inventors: Hojae Lee, Seoul (KR); Sangrim Lee, Seoul (KR); Kijun Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 78 days.

(21) Appl. No.: 17/920,712

(22) PCT Filed: Jul. 14, 2020

(86) PCT No.: PCT/KR2020/009266
§ 371 (c)(1),
(2) Date: Oct. 21, 2022

(87) PCT Pub. No.: WO2022/014737
PCT Pub. Date: Jan. 20, 2022

(65) Prior Publication Data
US 2023/0171002 A1    Jun. 1, 2023

(51) Int. Cl.
*H04B 10/11* (2013.01)
*H04B 10/67* (2013.01)
(Continued)

(52) U.S. Cl.
CPC ........ *H04B 10/6972* (2013.01); *H04B 10/67* (2013.01); *H04W 72/23* (2023.01)

(58) Field of Classification Search
CPC .............................. H04B 10/67; H04B 10/675
See application file for complete search history.

(56) References Cited

U.S. PATENT DOCUMENTS

2018/0048390 A1    2/2018  Palmer et al.
2018/0343066 A1*  11/2018  Caplan ............. H04B 10/50577
(Continued)

OTHER PUBLICATIONS

Fang Xu et al., "Impact of different noise sources on the performance of PIN-and APD-based FSO receivers", Proceedings of the 11th International Conference of Telecommunications, Aug. 2011, 10 pages.

(Continued)

*Primary Examiner* — Shi K Li
(74) *Attorney, Agent, or Firm* — LEE, HONG, DEGERMAN, KANG & WAIMEY

(57) ABSTRACT

According to one embodiment of the present invention, an apparatus and method for transmitting and receiving signals in a wireless communication system comprise receiving an optical signal including an interference signal and a target signal, attenuating the interference signal, and converting the optical signal in which the interference signal is attenuated, into electric signals via a photodiode array, wherein a transceiver comprises a first optical filter upon which the optical signal is incident, and a second optical filter upon which the optical signal having passed through the first optical filter is incident, wherein the interference signal may be attenuated through the first optical filter and the second optical filter.

13 Claims, 55 Drawing Sheets

(51) Int. Cl.
*H04B 10/69* (2013.01)
*H04W 72/23* (2023.01)

(56) References Cited

U.S. PATENT DOCUMENTS

2019/0173583 A1    6/2019   Ashrafi
2020/0266891 A1*   8/2020   Murakami ........... H04B 10/808

OTHER PUBLICATIONS

Ucuk Darusalam et al., "SNR and BER Performance Enhancement on FSO Induced by Atmospheric Turbulence Using Optical Spatial Filter", International Journal of Optics and Applications, pp. 51-57, Aug. 2017, 9 pages.
Sruthy Lathika et al., "A compact single channel interferometer to study vortex beam propagation", arXiv: 1912.01812v1, Dec. 2019, 26 pages.
PCT International Application No. PCT/KR2020/009266, International Search Report dated Apr. 9, 2021, 5 pages.

\* cited by examiner

Figure 9-Schematic mechanism for VPPM dimming

P plane Intensity    P plane Phase

P plane Intensity

P plane Phase

Q2 plane Intensity    Q2 plane Phase

P plane Intensity    P plane Irradiance

Q2 plane Intensity

Q2 plane Phase

Q2 plane Irradiance

Q2 plane Intensity 　　Q2 plane Phase

P plane Intensity  P plane Irradiance

Q2 plane Intensity

Q2 plane Phase

Q2 plane Intensity  Q2 plane Phase

P plane Intensity

P plane Irradiance

APPARATUS AND METHOD FOR TRANSMITTING AND RECEIVING SIGNALS IN WIRELESS OPTICAL COMMUNICATION SYSTEM

CROSS-REFERENCE TO RELATED APPLICATIONS

This application is the National Stage filing under 35 U.S.C. 371 of International Application No. PCT/KR2020/009266, filed on Jul. 14, 2020, the contents of which are all incorporated by reference herein in their entirety.

TECHNICAL FIELD

The present disclosure relates to a method and apparatus for transmitting and receiving a signal in a wireless optical communication system. More specifically, the present disclosure relates to a signal transmission and reception method including adaptively adjusting an orbital angular momentum (OAM) step.

BACKGROUND ART

Optical wireless communication systems may be largely divided into visible light communication (VLC) systems and free-space optical (FSO) communication systems according to the frequency and purpose of photons.

VLC plays the role of lighting and communication at the same time. Information is transmitted by visible light, which may depend on the intensity of the light or the blinking of the light. To this end, visible light devices such as a light emitting diode (LED) is commonly used.

Free space optical (FSO) communication mainly plays the role of communication and is usually used in a free space environment or an environment where signal straightness is guaranteed. The FSO communication also covers ultraviolet (UV) and infrared (IR) light as well as visible light. Unlike VLC, FSO communication is not involved in lighting, so there are no restrictions on lighting. In general, not only LEDs but also devices based on the straightness of light such as light amplification by stimulated emission of radiation (LASER) are used.

Legacy optical communication has a disadvantage in that it is difficult to guarantee decoding performance of a receiver due to the influence of an external interference light source. In particular, interference from strong sunlight may remarkably reduce the decoding performance of the receiver. Therefore, there is a need for a method of transmitting and receiving wireless optical communication that is robust against external interference.

DISCLOSURE

Technical Problem

An object of the present disclosure is to provide a transmission and reception method and apparatus for wireless optical communication.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides a method and apparatus for transmitting and receiving signals in a wireless communication system.

According to an aspect of the present disclosure, provided herein is a method of transmitting and receiving a signal by a first communication device in wireless optical communication, including: receiving an optical signal including a desired signal and an interference signal; reducing the interference signal; and converting the optical signal in which the interference signal is reduced into an electrical signal through a photodiode array. The interference signal is reduced through a first optical filter on which the optical signal is incident and a second optical filter on which the optical signal passing through the first optical filter is incident.

In another aspect of the present disclosure, provided herein is a first communication device for transmitting and receiving a signal in a wireless optical communication system, including: at least one transceiver; at least one processor; and at least one memory operably connected to the at least one processor and configured to store instructions causing, when executed, the at least one processor to perform a specific operation. The specific operation includes receiving an optical signal including a desired signal and an interference signal, reducing the interference signal, and converting the optical signal in which the interference signal is reduced into an electrical signal through a photodiode array. The transceiver includes a first optical filter on which the optical signal is incident and a second optical filter on which the optical signal passing through the first optical filter is incident, and the interference signal is reduced through the first optical filter and the second optical filter.

In another aspect of the present disclosure, provided herein is an apparatus for a first communication device, including: at least one processor; and at least one computer memory operably connected to the at least one processor and configured to cause, when executed, the at least one processor to perform an operation. The operation includes receiving an optical signal including a desired signal and an interference signal, reducing the interference signal, and converting the optical signal in which the interference signal is reduced into an electrical signal through a photodiode array. The transceiver includes a first optical filter on which the optical signal is incident and a second optical filter on which the optical signal passing through the first optical filter is incident, and the interference signal is reduced through the first optical filter and the second optical filter.

In another aspect of the present disclosure, provided herein is a computer readable storage medium including at least one computer program causing, when executed, at least one processor to perform an operation. The operation includes receiving an optical signal including a desired signal and an interference signal, reducing the interference signal, and converting the optical signal in which the interference signal is reduced into an electrical signal through a photodiode array. The transceiver includes a first optical filter on which the optical signal is incident and a second optical filter on which the optical signal passing through the first optical filter is incident, and the interference signal is reduced through the first optical filter and the second optical filter.

In the above methods and apparatuses, the interference signal may be reduced based on a length D1 of the first optical filter, a length D2 of the second optical filter, a focal length F1 between the first optical filter and the second optical filter, a distance F2 between the second optical filter and the photodiode array, and/or a length Dp of the photodiode array.

D1, D2, F1, F2, and/or Dp may be determined in consideration of a wavelength of the desired signal, an interference level, and/or a distance between the first communication device and a second communication device.

In the above methods and apparatuses, the first communication device may further include one or more optical filters in addition to the first optical filter and the second optical filter.

The first optical filter, the second optical filter, and/or the one or more optical filters may be enabled or disabled based on an interference level.

In the above methods and apparatuses, a first mode may be applied to the desired signal based on an interference level of the interference signal being equal to or less than a threshold, and a certain light intensity or more of the desired signal may be located within a certain distance from a center of the photodiode array based on application of the first mode.

Information about whether the first mode is applied may be (i) transmitted by a communication method other than the wireless optical communication or (ii) broadcast through the wireless optical communication.

In the above methods and apparatuses, a valid area of the photodiode array may include a photodiode having an irradiance power equal to or greater than a second threshold, and an optical signal arriving at a photodiode included in the valid area may be converted into the electrical signal.

The second threshold may be set based on a greatest irradiance power measured in the photodiode array.

In the methods and apparatuses, each of the communication devices may include an autonomous driving vehicle configured to communicate at least with a terminal, a network, and another autonomous driving vehicle other than the communication device.

It will be understood by those skilled in the art that the above-described aspects of the present disclosure are merely part of various embodiments of the present disclosure, and various modifications and alternatives could be developed from the following technical features of the present disclosure.

Advantageous Effects

Through a signal transmission and reception method in a wireless optical communication system according to an aspect of the present disclosure, optical interference may be minimized.

The above-described aspects of the present disclosure are merely some of the preferred embodiments of the present disclosure, and various embodiments reflecting the technical features of the present disclosure may be derived and understood by those skilled in the art based on the following detailed description of the disclosure.

BRIEF DESCRIPTION OF DRAWINGS

The accompanying drawings, which are included to provide a further understanding of the disclosure, illustrate embodiments of the disclosure and together with the description serve to explain the principle of the disclosure.

BEST MODE

Figure 1:
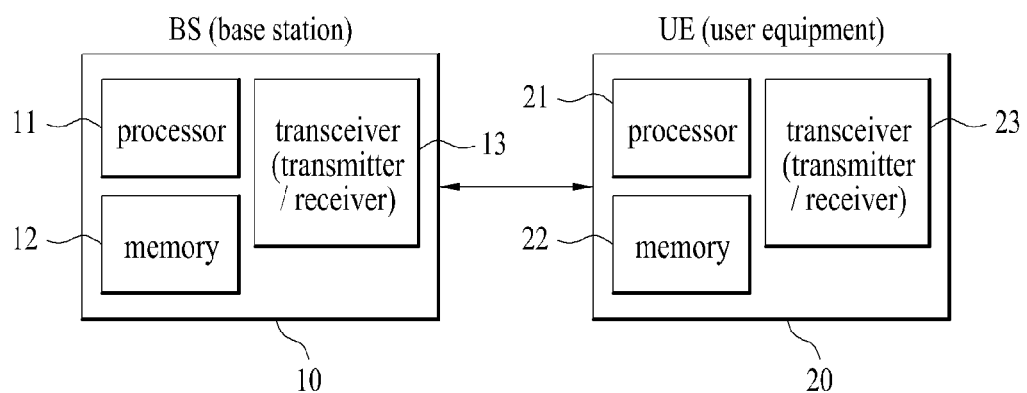
FIG. 1 is a diagram illustrating an exemplary system for implementing the present disclosure.

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes the 3GPP LTE and LTE-A and 5G systems, the following descriptions are applicable to other random mobile communication systems by excluding unique features of the 3GPP LTE and LTE-A systems.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. In addition, assume that a base station (BS) is a common name of such a random node of a network stage communicating with a terminal as a Node B (NB), an eNode B (eNB), an access point (AP) and the like.

In a mobile communication system, a UE can receive information from a BS in downlink and transmit information in uplink. The UE can transmit or receive various data and control information and use various physical channels depending types and uses of its transmitted or received information.

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE.

Moreover, in the following description, specific terminologies are provided to help the understanding of the present disclosure. And, the use of the specific terminology can be modified into another form within the scope of the technical idea of the present disclosure.

FIG. 1 is a diagram illustrating a system for implementing the present disclosure.

Referring to FIG. 1, a wireless communication system includes a BS 10 and one or more UEs 20. On downlink (DL), a transmitter may be a part of the BS 10 and a receiver may be a part of the UE 20. On uplink (UL), the BS 10 may include a processor 11, a memory 12, and a radio frequency (RF) unit 13 (transmitter and receiver). The processor 11 may be configured to implement the proposed procedures and/or methods disclosed in the present application. The memory 12 is coupled to the processor 11 to store a variety of information for operating the processor 11. The RF unit 13 is coupled to the processor 11 to transmit and/or receive radio signals. The UE 20 may include a processor 21, a memory 22, and an RF unit 23 (transmitter and receiver). The processor 21 may be configured to implement the proposed procedures and/or methods disclosed in the present application. The memory 22 is coupled to the processor 21 to store a variety of information for operating the processor 21. The RF unit 23 is coupled to the processor 21 to transmit and/or receive radio signals. The BS 10 and/or the UE 20 may include a single antenna and multiple antennas. If at least one of the BS 10 or the UE 20 includes multiple antennas, the wireless communication system may be called a multiple input multiple output (MIMO) system.

In the present specification, although the processor 21 of the UE and the processor 11 of the BS perform an operation of processing signals and data, except for a function of receiving or transmitting signals and a function of storing signals, the processors 11 and 21 will not be especially mentioned for convenience of description. Even though the processors 11 and 21 are not particularly mentioned, it may be said that the processors 11 and 21 perform operations of processing data except for a function of receiving or transmitting signals.

The present disclosure proposes various new frame structure for a 5th generation (5G) communication system. In the next generation 5G system, communication scenarios are classified into Enhanced Mobile Broadband (eMBB), Ultra-reliability and low-latency communication (URLLC), Massive Machine-Type Communications (mMTC), etc. Here, eMBB is the next generation mobile communication scenario having such properties as High Spectrum Efficiency, High User Experienced Data Rate, High Peak Data Rate and the like, URLLC is the next generation mobile communication scenario having such properties as Ultra Reliable, Ultra Low Latency, Ultra High Availability and the like (e.g., V2X, Emergency Service, Remote Control), and mMTC is the next generation mobile communication scenario having such properties as Low Cost, Low Energy, Short Packet, Massive Connectivity and the like (e.g., IoT).

Figure 2:
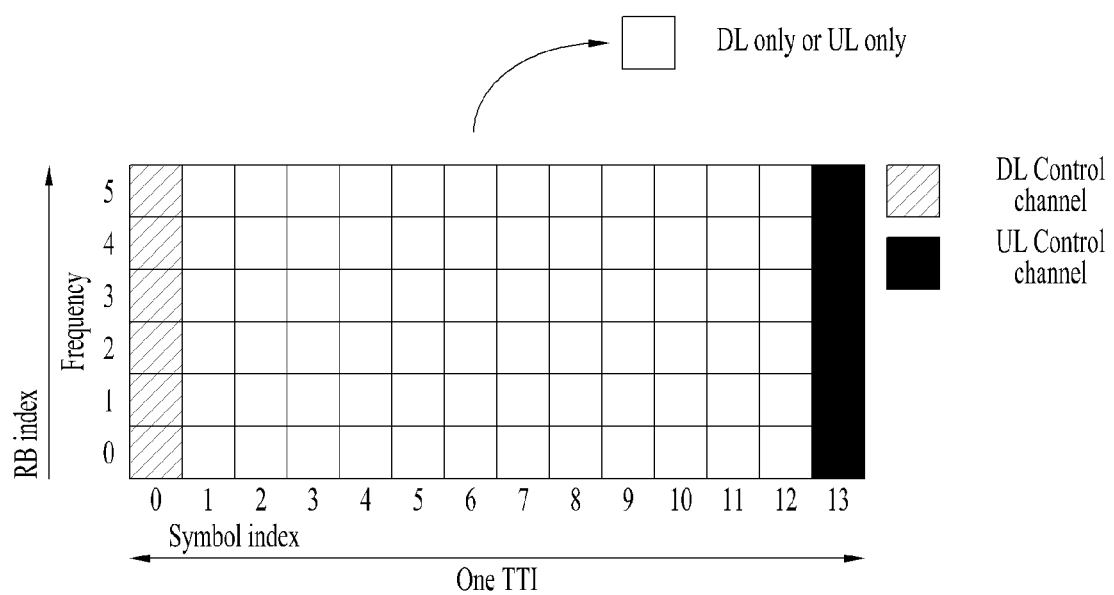
FIG. 2 is a diagram illustrating an exemplary subframe structure in which a data channel and a control channel are multiplexed in time division multiplexing (TDM).

FIG. 2 is a diagram illustrating an exemplary subframe structure in which a data channel and a control channel are multiplexed in time division multiplexing (TDM). In 5G NR, a frame structure in which a control channel and a data channel are multiplexed according to TDM like FIG. 2 may be considered in order to minimize latency.

In FIG. 2, the hatched area represents a transmission region of a DL control channel carrying DCI (e.g., PDCCH), and the last symbol represents a transmission region of a UL control channel carrying UCI (e.g., PUCCH). Here, the DCI is control information transmitted from a gNB to a UE and may include information on a cell configuration the UE should know, DL-specific information such as DL scheduling, UL-specific information such as a UL grant, etc. The UCI is control information transmitted from the UE to the gNB and may include a HARQ ACK/NACK report on DL data, a CSI report on a DL channel state, a scheduling request (SR), etc.

In FIG. 2, blank areas are available for flexible configuration of DL or UL periods to achieve DL/UL flexibility. For example, a blank area may be used as a data channel for DL data transmission (e.g., a physical downlink shared channel (PDSCH)) or a data channel for UL data transmission (e.g., a physical uplink shared channel (PUSCH)). This structure is characterized in that since a DL transmission and a UL transmission may be performed sequentially in one subframe, an eNB may transmit DL data in the subframe to a UE and receive an HARQ ACK/NACK signal for the DL data in the subframe from the UE. That is, the time required to retransmit data when a data transmission error occurs may be reduced, thereby minimizing the latency of final data transmission.

In the self-contained subframe structure, a time gap is necessary in order that the gNB and UE switch to a reception mode from a transmission mode, and vice versa. For the switching between the transmission mode and the reception mode, some OFDM symbols at the time of DL-to-UL switching may be configured as a guard period (GP) in the self-contained subframe structure.

Visible Light Communication (VLC)

Figure 3:
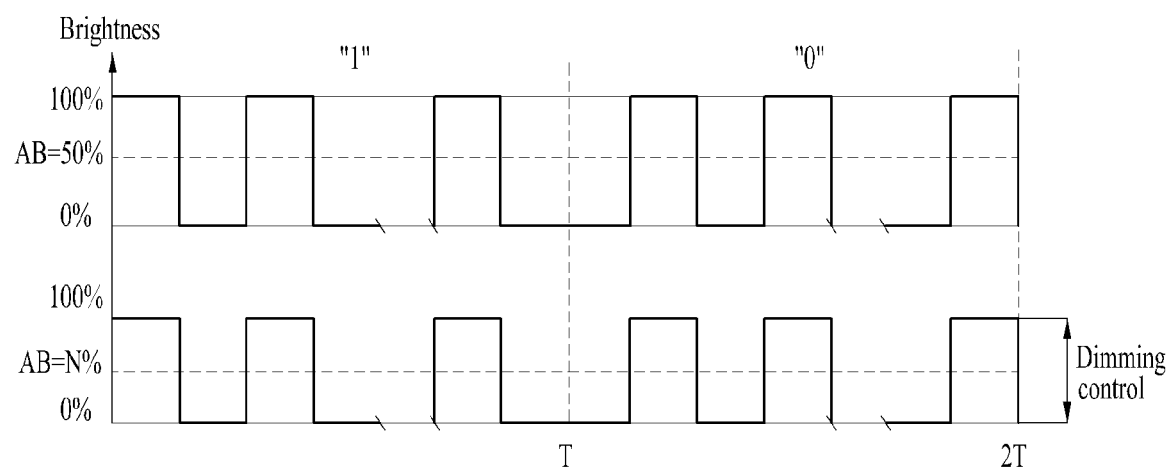
FIGS. 3 to 4 are diagrams illustrating single carrier modulation (SCM) for visible light communication.
Figure 4:
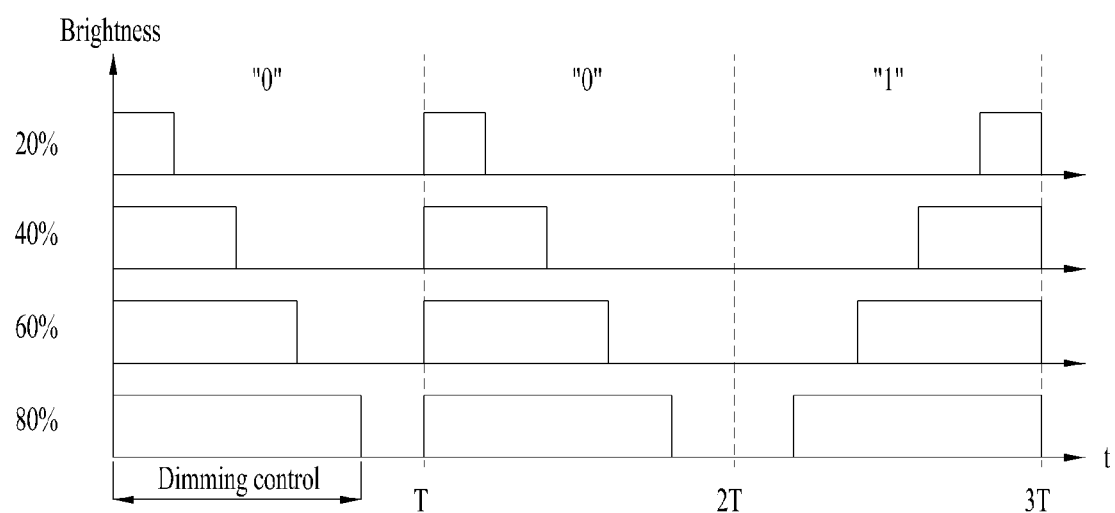

Generally, for a visible light systems, single carrier modulation (SCM) schemes based on on-off keying (OOK) for presenting signals based on flickering of visible light are provided. Referring to FIGS. 3 and 4, OOK modulation is a scheme of presenting digital signals 1 and 0 according to the ON and OFF of the light source. OOK modulation may be modified to methods such as pulse position modulation (PPM), which performs modulation into a pulse position based on a clock.

Regarding the visible light communication system, research on multi-carrier modulation (MCM) schemes have been conducted. Compared to the single carrier modulation scheme, the MCM scheme is robust to multipath, and enables operation of a single tap equalizer. It is also robust to DC wandering and flickering interference. The MCM-based waveform for VLC must satisfy the conditions that i) it has only one dimension (real-value) signal and ii) it has unipolar characteristics.

Figure 5:
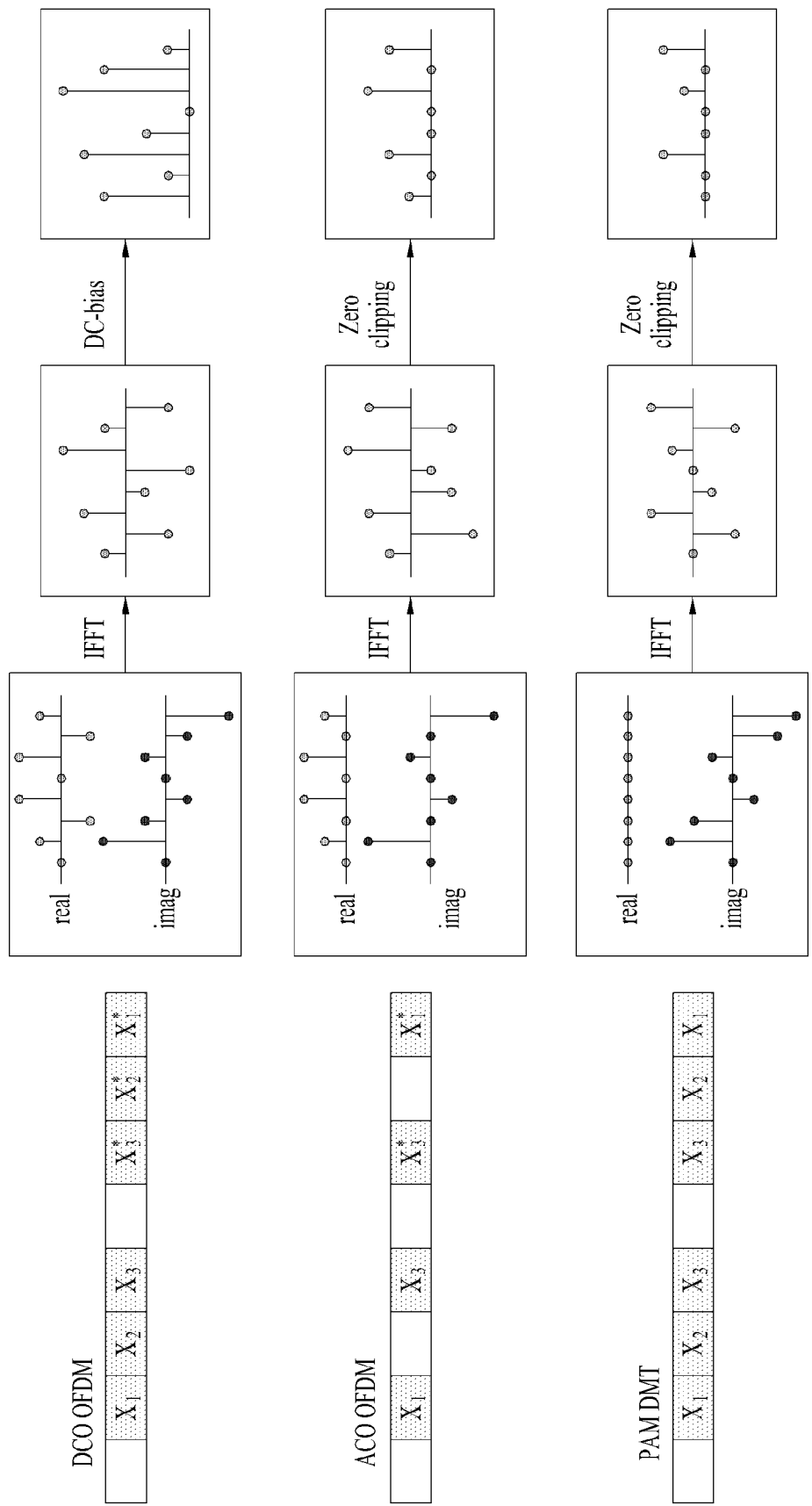
FIG. 5 is a diagram illustrating multi-carrier modulation (MCM) for visible light communication.

Various MCM schemes satisfying the above conditions have been introduced. These MCM schemes may be classified into DC-biased optical OFDM (DCO-OFDM), asymmetrically clipped optical OFDM (ACO-OFDM), and pulse-amplitude modulated discrete multi-tone modulation (PAM-DMT). These schemes will be described with reference to FIG. 5.

i) DCO-OFDM: This corresponds to the first subcarrier mapping of FIG. 5, in which modulated symbols are Hermitian symmetrically arranged. The Hermitian symmetric arrangement means arranging symbols in the form of conjugate so as to be symmetry with respect to the DC subcarrier as a boundary. In this arrangement method, a waveform in the time domain is transformed into a real value signal. Thereafter, a final unipolar time domain signal is created by biasing the transformed signal as much as the minimum value (i.e., negative value with maximum amplitude) in the time domain stage.

ii) ACO-OFDM: This corresponds to the second subcarrier mapping of FIG. 5. Half of the modulated symbols in DCO-OFDM are arranged Hermitian symmetrically at constant intervals. In this subcarrier mapping, a waveform in the time domain takes the form of a real value signal and is repeated with an inverted sign. Then, a final unipolar time domain signal is created by zero clipping the waveform that appears repeatedly as described above.

iii) PAM-DMT: This corresponds to the third subcarrier mapping of FIG. 5. In this scheme, a real value signal is placed in the imaginary part by flipping the same with respect to the center in the PAM fashion. In this subcarrier mapping, the waveform in the time domain takes the form of a real value signal and repeatedly appears in a symmetric form with an inverted sign. Similar to ACO-OFDM, a final unipolar time domain signal is created by performing zero clipping.

Table 1 describes the performance measure of each of the aforementioned schemes DCO-OFDM, ACO-OFDM and PAM-DMT. The performance measure may be, for example, spectral efficiency (SE), PAPR, signal-to-noise ratio (SNR), or bit error rate (BER).

TABLE 1

|  | SE | SNR | BER |
| --- | --- | --- | --- |
| DCO OFDM | ● | X | X |
| ACO OFDM | X | ● | ● |
| PAM DMT OFDM | X | ● | ▲ |

Referring to Table 1, DCO-OFDM has half the SE for the Hermitian symmetry, but this may be seen as the most optimal SE in unipolar OFDM. However, in DCO OFDM, the SNR characteristic is deteriorated because a portion of the transmit power actually carried on the signal is small due to the bias (wherein the DC-bias value is a constant, and does not affect the performance of modulated symbol detection at the receiving side).

Referring to Table 1, ACO-OFDM has a disadvantage of having half SE of DCO OFDM. However, since DC bias is not required and the entire transmit power is carried on the desired signal, this scheme has a relatively good SNR characteristic.

Referring to Table 1, the PAM DMT has almost the same characteristics as the ACO OFDM. However, it is based on amplitude in one dimension, rather than using a quadrature complex symbol for modulation. Accordingly, the distance between symbols is reduced, and thus BER performance is lower than that in ACO OFDM.

Figure 6:
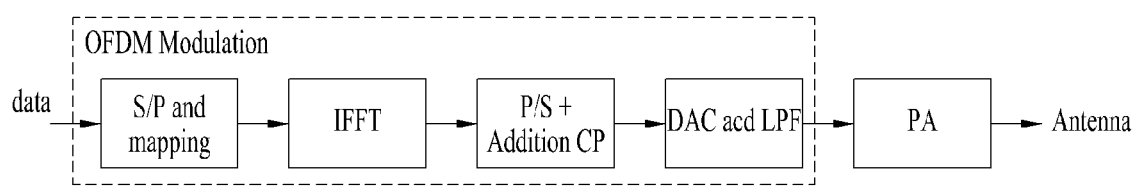
FIG. 6 is a diagram illustrating the OFDM modulation structure at the transmitting side of the conventional RF communication system.

FIG. 6 is a diagram illustrating the OFDM modulation structure at the transmitting side of the conventional RF communication system. Referring to FIG. 6, an analog signal obtained through OFDM modulation is amplified through an RF power amplifier (PA). In this case, the maximum amplified magnitude of the signal may be limited by the performance limit of the PA.

Figure 7:
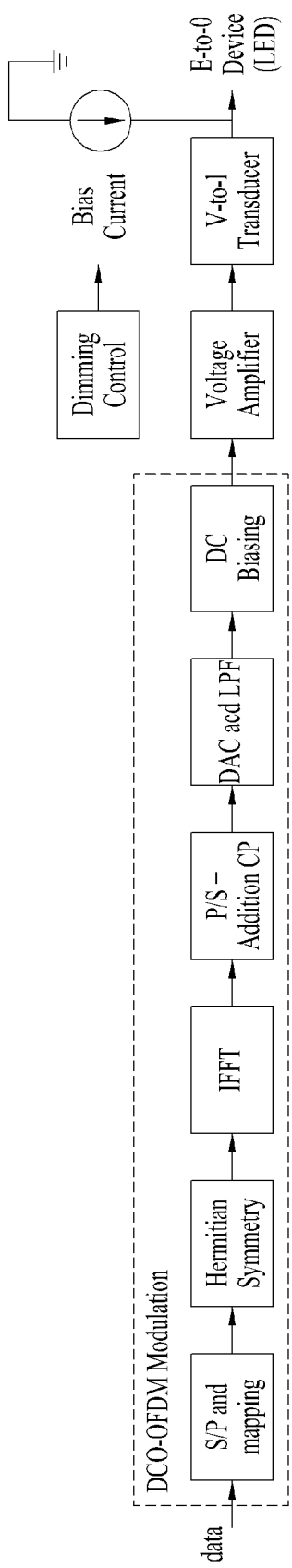
FIGS. 7 to 8 are diagrams illustrating the structure of a multi-carrier modulation transmitter of a visible light communication system.
Figure 8:
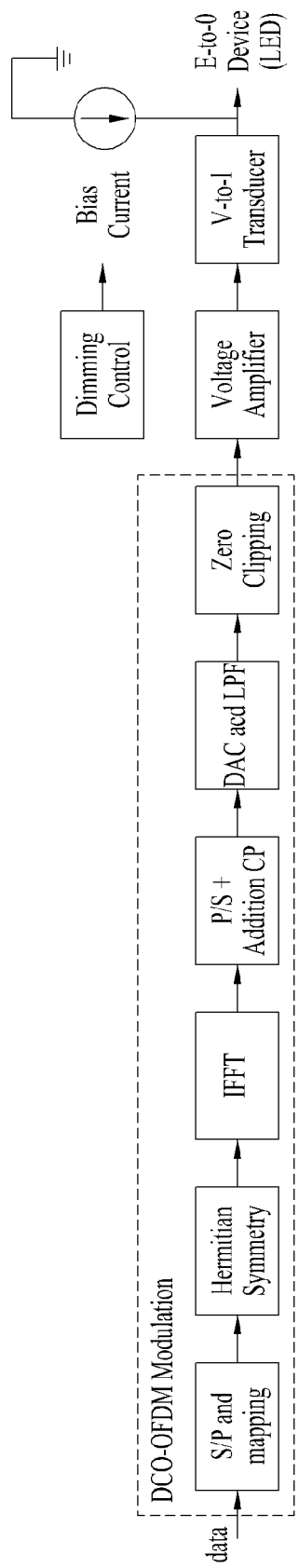

On the other hand, the structure of a multi-carrier modulation transmitter of the visible light communication system as shown in FIGS. 7 to 8. More specifically, FIG. 7 shows the structure of a DCO-OFDM modulation transmitter of the VLC communication system, and FIG. 8 shows the structure of an ACO-OFDM modulation transmitter of the VLC communication system.

Referring to FIGS. 7 to 8, a voltage amplifier, a voltage-to-current (V-to-I) transducer, and an electrical-to-optical (E-to-O) device (e.g., LED) all have non-linear characteristics. Therefore, an analog signal obtained through modulation is amplified and transformed. In FIGS. 7 to 8, dimming control through DC biasing is exemplified. In the case of the operation based on reverse polarity, dimming control may be performed through signal reconstruction.

Color-Shift Keying (CSK) Modulation

Figure 9:
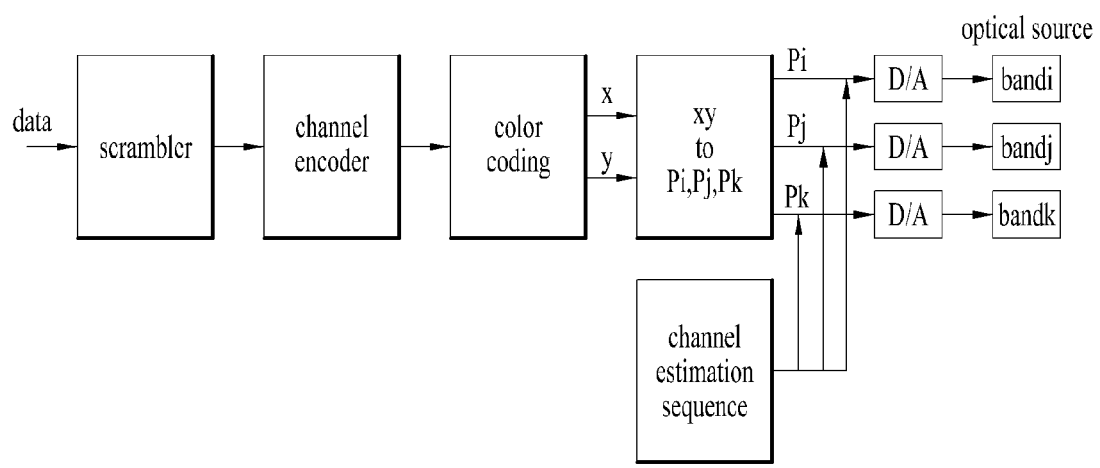
FIG. 9 is a diagram illustrating color-shift keying (CSK) modulation.

The aforementioned SCM and MCM may be operated based on color-shift keying (CSK) modulation. CSK modulation is a method for expressing a digital signal by combining colors based on the color characteristics of a light source. For example, when a digital signal is generated as illustrated in FIG. 9, the digital signal is transformed into a (x, y) color space signal through color coding. The transformed (x, y) color space signal is transmitted by a light source having a color. The color space may be defined as shown in FIG. 10, and the chromaticity distribution table may conform to the CIE 1931 color space (IEEE 802.15.7).

Figure 10:
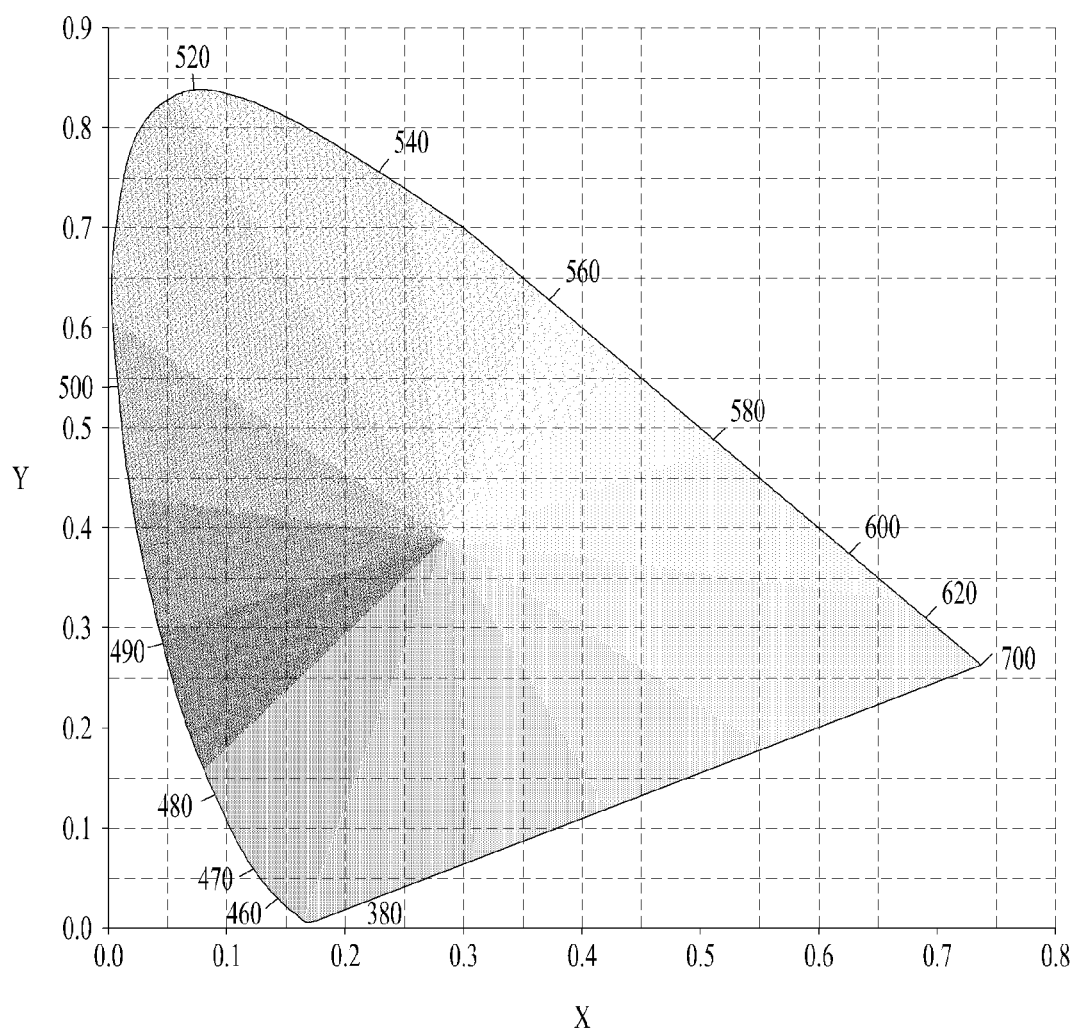
FIGS. 10 to 11 are diagrams illustrating an entire color space according to wavelength and a specific color space that may be expressed according to device characteristics.
Figure 11:
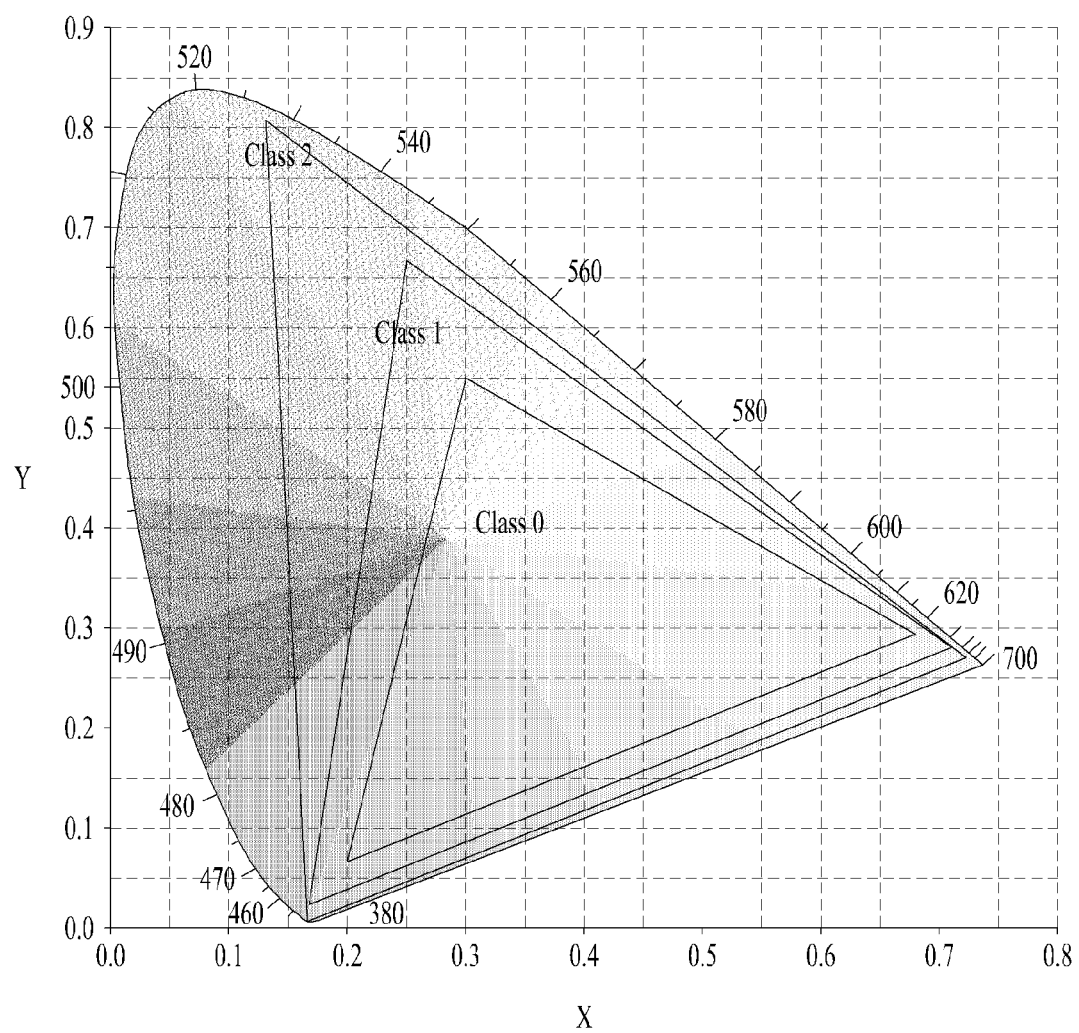

Referring to FIG. 10, the outer curved boundary line corresponds to monochromatic light, and the wavelength of each monochromatic light is indicated in nanometers. The colors shown in FIG. 10 may slightly differ among the color spaces of the color display devices. No conventionally known device may accurately present all the colors shown in FIG. 10. That is, as shown in FIG. 11, the range of colors that may be expressed may differ among the classes of equipment.

When one color is not represented by monochromatic light, it may be generated by mixing a plurality of color light sources (e.g., LEDs). The color point (x, y) is transformed by RGB. Referring to Equation 1, R, G, and B values are transformed into X, Y, and Z values to correspond to (x, y) values in the color space.

$$X = 2.7689R + 1.7517G + 1.1302B \quad \text{[Equation 1]}$$

$$Y = R + 4.5907G + 0.0601B$$

$$Z = 0.0565G + 5.5943B$$

$$x = \frac{X}{X+Y+Z}, \quad y = \frac{Y}{X+Y+Z}$$

Figure 12:
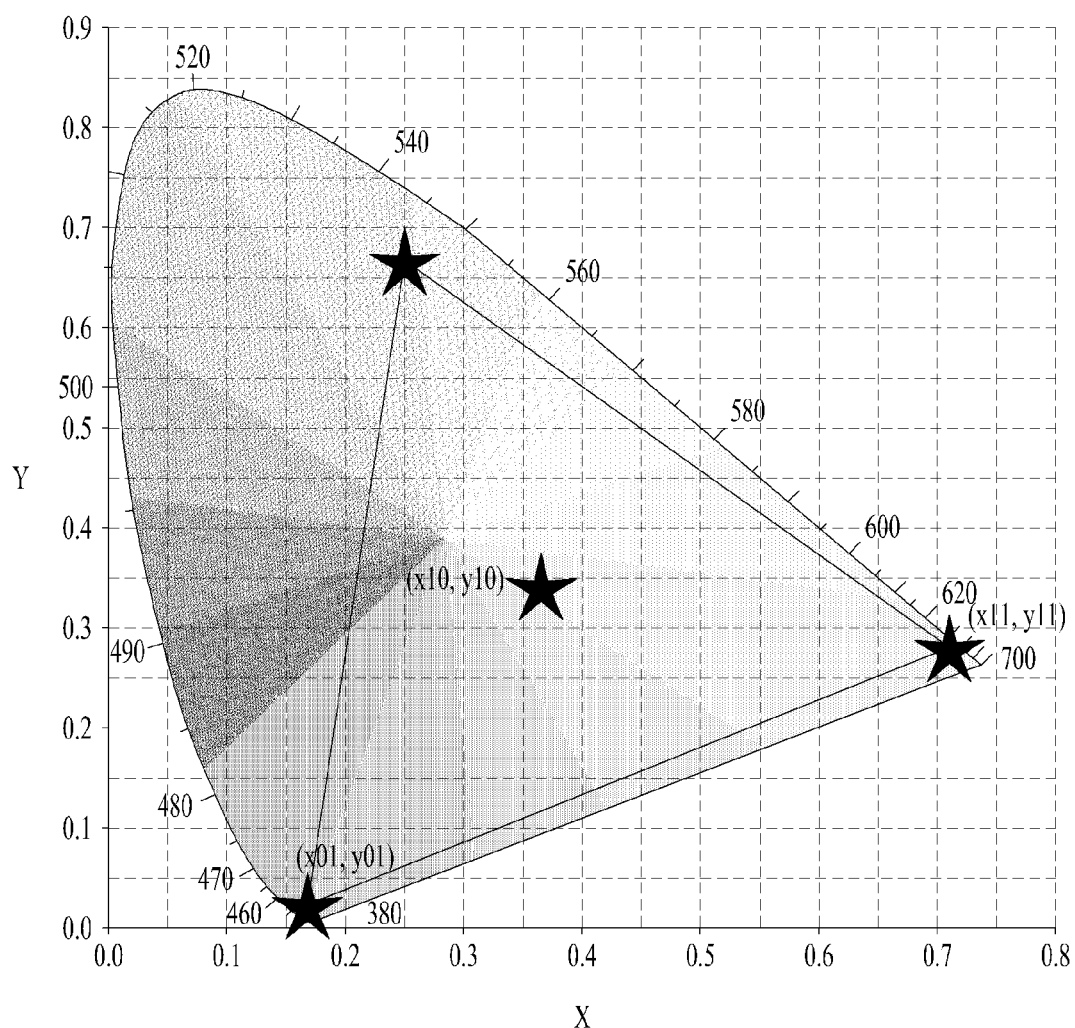
FIG. 12 is a diagram illustrating a method for modulating a binary digital signal in a color space.

Based on the above characteristics, a binary digital signal may be modulated. For example, when it is assumed that the range of colors that may be expressed by a specific device is given as shown in FIG. 12, a binary bit stream corresponding to the star-shaped marks may be defined as shown in Table 2. That is, a signal may be modulated based on the Euclidean distance in the color space.

TABLE 2

| 4 CSK | Set Class 0 |
|---|---|
| 00 | (x00, y00) |
| 01 | (x01, y01) |
| 10 | (x10, y10) |
| 11 | (x11, y11) |

Figure 13:
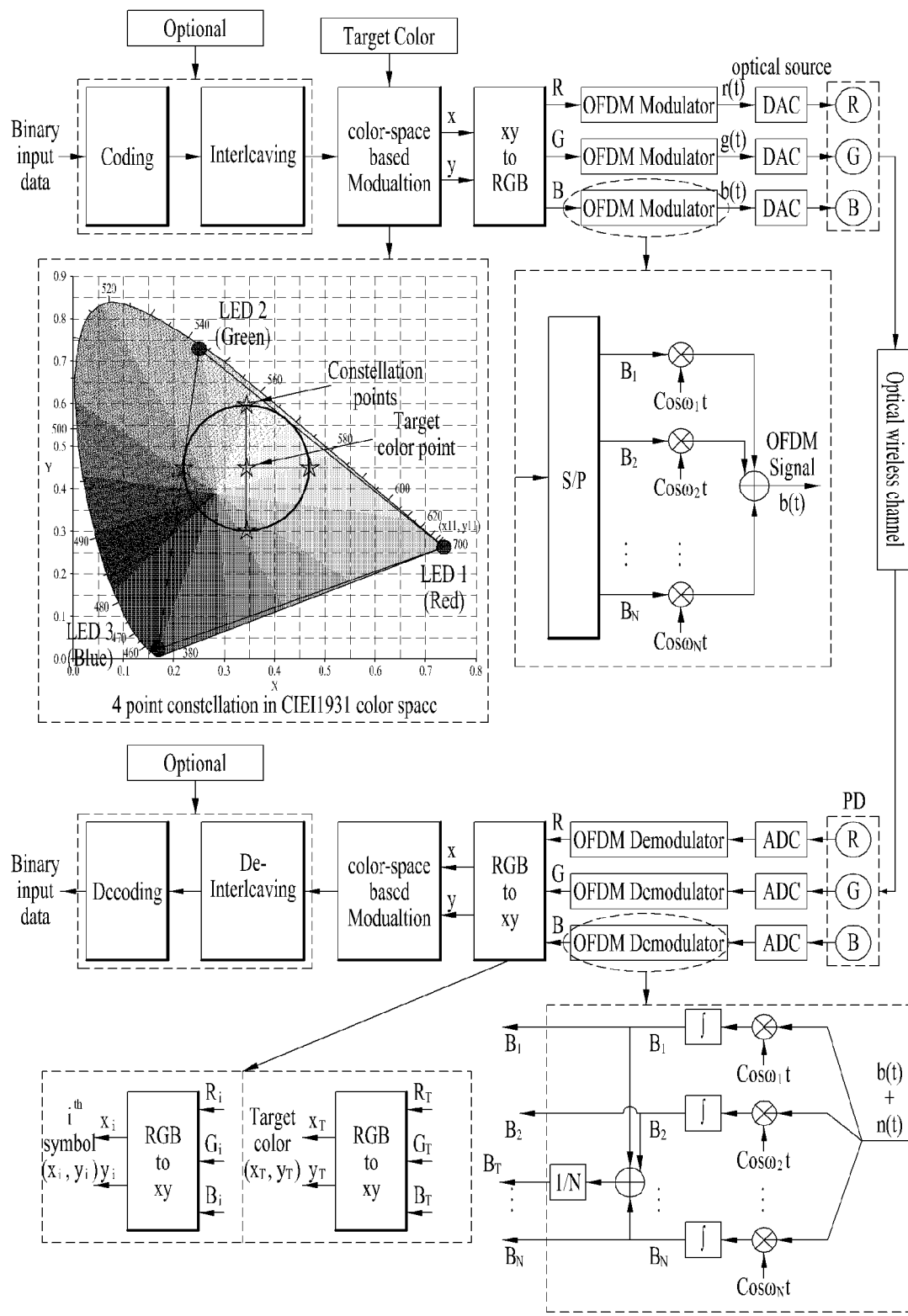
FIG. 13 is a diagram illustrating application of color-shift keying (CSK) modulation to MCM.

The above-described method applied to the MCM may be configured as shown in FIG. 13. That is, as in SCM, the transmitter i) transforms an analog signal generated through an OFDM modulator for R, G, and B values corresponding to (x, y) coordinates in a color space into an optical source through each light source, LED, and ii) transmits the sources on an optical channel. The receiver ii) receives a signal through a photo diode, ii) converts the analog signal to a digital signal through an OFDM demodulator, and iii) matches each signal of R, G, and B to color space (x, y) and decodes the signal by the (x, y) values.

The data transmission method based on the conventional optical wireless communication system described with reference to FIGS. 3 to 13 has a problem in that it is difficult to guarantee the decoding performance of the receiver due to the influence of an external interference light source. In particular, interference from strong sunlight may significantly reduce the decoding performance of the receiver. Accordingly, there is a need for a signal transmission and reception method in an optical wireless communication system that is robust to external interference.

In an example or implementation of the present disclosure, a method of minimizing interference based on the orbital angular momentum of a photon in optical wireless communication is proposed. In an example or implementation of the present disclosure, a transmitter transmits radio light, and a receiver decodes the radio light. An optical wireless communication system according to an example or implementation of the present disclosure may have the structure shown in FIG. 14.

Figure 14:
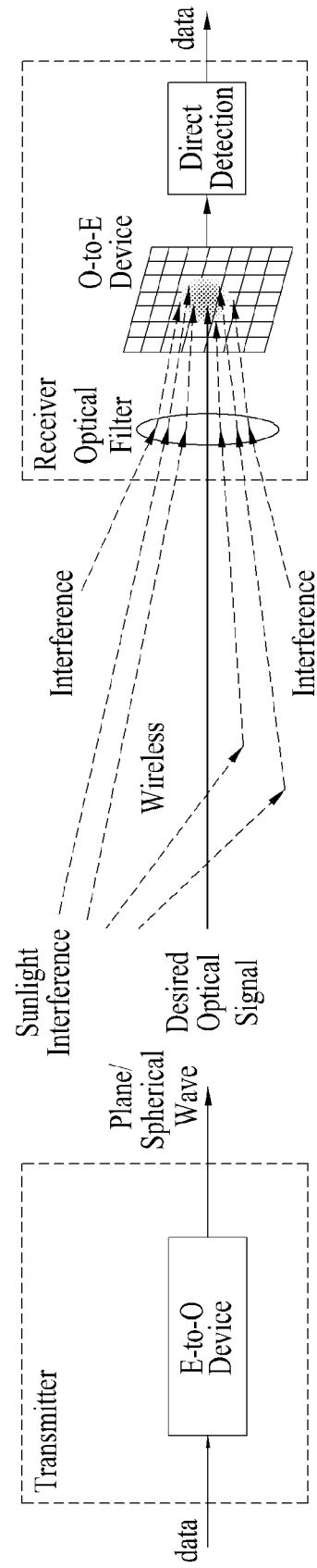
FIGS. 14 to 16 are diagrams illustrating optical wireless communication systems according to examples or implementations of the present disclosure.

Referring to FIG. 14, the transmitter converts data to be transmitted (e.g., electrical signal) into a photon (optical) source by an electrical-to-optical (E-to-O) device and transmits the photon source to the receiver in a wireless environment. The photon source may be referred to as radio light.

Here, the radio light may be interpreted as a wave corresponding to a set of photons and classified into a plane wave and a spherical wave according to the shape of a wavefront. The plane wave refers to a wave with a straight or planar wavefront. For example, the plane wave may be artificially generated by resonance as in a laser beam. The spherical wave refers to a wave in which the wavefront forms a concentric spherical surface around a wave source when the wave source is a point in space. When the spherical wave propagates away, wavefronts are almost parallel to each other, so that the spherical wave may be regarded as the plane wave from the viewpoint of the receiver.

When the receiver receives a desired optical signal including data in a wireless environment, the receiver may receive i) interference from other sources and ii) solar interference from the sun along with the desired optical signal. The receiver may decode the desired optical signal into the data based on i) an optical filter for determining the radio light used for the desired optical signal, ii) an O-to-E device that converts the receiver radio light into an electrical signal, and iii) direct detection for analyzing the signal.

Figure 15:
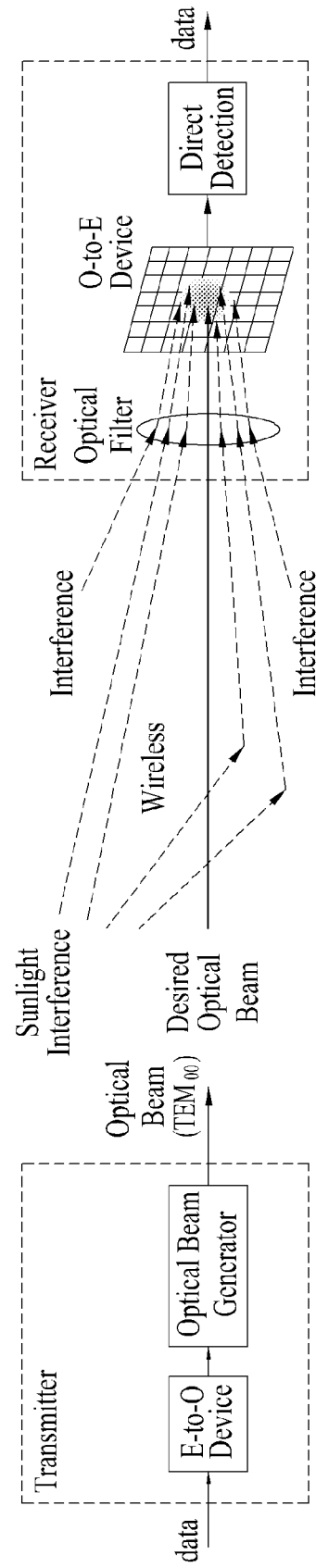

On the other hand, according to an example or implementation of the present disclosure shown in FIG. 15, the transmitter may transmit to the receiver in a wireless environment by i) converting data to be transmitted (e.g., electrical signal) into a photon source with an E-to-O device and ii) generating an optical beam with an optical beam generator.

In optics, radio light may be represented as a beam. In an example or implementation of the present disclosure, a case in which an optical beam is configured based on a transverse electromagnetic field/wave (TEM) mode corresponding to a resonant mode among transverse modes of electromagnetic radiation will be described.

The TEM mode may be divided into $TEM_{lm}$ by indices $l$ and $m$ according to beam formation. In general, the basic form of the TEM mode is a Gaussian beam, which is represented by $TEM_{00}$. $TEM_{00}$ refers to an optical beam in which a wave amplitude distribution on a cross-section perpendicular to an optical axis is expressed by a Gaussian function.

When the receiver receives a desired optical beam including data in a wireless environment, the receiver may receive i) interference from other sources and ii) solar interference from the sun along with the desired optical signal. The receiver may decode the desired optical beam into the data based on i) an optical filter for determining the radio light used for the desired optical beam, ii) an O-to-E device that converts the receiver radio light into an electrical signal, and iii) direct detection for interpreting the signal.

In the above-described two methods, if the receiver uses an optical filter to receive only a band corresponding to the desired optical signal/beam from the entire signal or uses polarized light, the receiver may not fully control interference because sunlight has energy in all bands and includes polarized light in all direction from the perspective of optics.

1. Optical Wireless Communication Transmission and Reception Procedure Based on Photon Orbital Angular Momentum (OAM)

Before describing examples or implementations of the present disclosure, the orbital angular momentum (OAM) characteristic of a photon will be described first.

An electromagnetic wave consists of an electric field and a magnetic field. Angular momentum may be defined by a change in the direction of the electric field. When the direction change of the electric field oscillates perpendicular to the direction of propagation of one electromagnetic wave (or photon), it is called linear polarization. On the other hand, when the direction change of the electric field rotates around the direction of propagation of one electromagnetic wave (or photon), it is called circular polarization.

Light has spin angular momentum (SAM) for each photon, which is expressed by ±h. Wavefronts on which electromagnetic waves (or photons) propagate at the same time is called a phase front, and a plane phase front or plane wave means that all electromagnetic waves have the same phase on wavefronts propagating at the same time.

If an electromagnetic wave is not the plane wave, it is said that the electromagnetic wave has a helical phase front, and in general, it may be referred to as an electromagnetic wave with OAM. Light has OAM for each photon, which is expressed by mh. Since the OAM is the definition of a wavefront, electromagnetic waves at each point may be linearly polarized or circularly polarized. The OAM may be called Laguerre-Gaussian modes (e.g., LG beam) or cylindrical transverse mode patterns, $TEM_{(pl)}$ in the optical definition. In an example or implementation of the present disclosure, it is defined for TEM(pl) that p=0 and l is a value corresponding to the OAM mode index. For example, OAM mode 3 is $TEM_{(03)}$. In the present disclosure, only a case of p=0 is assumed for convenience of description, but the present disclosure may be applied in the same way even when p is not zero.

In an example or implementation of the present disclosure, both a radio source and a photon source refer to an electromagnetic wave. However, to distinguish from the conventional communication, the frequency bands of the radio and photon sources according to an example or implementation of the present disclosure are exemplarily limited as follows. The frequency band of the radio source is several terahertz or less, which is defined as a band considered in general wireless communication systems. The frequency band of the photon source is greater than several terahertz, which is defined as a band (e.g., infrared, ultraviolet, visible light, etc.) considered in wireless optical systems. In a special purpose environment, the methods proposed in the present disclosure may be equally applied to x-rays and gamma rays.

In an example or implementation of the present disclosure, a transmission and reception method in an optical wireless communication system based on photon OAM is proposed. Specifically, initial access based on legacy links and initial access based on broadcast messages will be described.

1.1. Initial Access Based on Legacy Link

A transmitting UE and receiving UE may share initial information for optical wireless communication through legacy links (e.g., LTE, LTE-A, NR, Wi-Fi, Bluetooth, etc.). The initial information for optical wireless communication may include the following.

i) Band for transmission and reception: This may mean a frequency band or light wavelength range for transmission and reception of data and control information.

ii) Polarization for transmission and reception: This may mean a polarization direction for transmission and reception of data and control information. For example, it may be agreed between the transmitting UE and receiving UE that data and control information is exchanged based on only vertical polarization for interference control.

iii) OAM mode for transmission and reception: This may mean an OAM mode index for transmission and reception of data and control information.

iv) Baseband modulation for transmission and reception: This may mean a baseband modulation method for transmission and reception of data and control information. For example, for data modulation and demodulation, i) an on/off keying (OOK) method may be used for single carrier modulation, or ii) an orthogonal frequency-division multiplexing (OFDM) method may be used as for multi-carrier modulation, which may be agreed between the transmitting UE and receiving UE.

1.2. Initial Access Based on Broadcast Message

A transmitting UE and receiving UE may share initial information based on broadcast messages. For example, the transmitting UE and receiving UE may broadcast a predetermined broadcast message on an optical or radio resource as in broadcast over a physical broadcast channel (PBCH) or common control channel of LTE/LTE-A in order to share the initial information for optical wireless communication. The initial information for optical wireless communication may be as follows.

i) Band for transmission and reception: This may mean a frequency band or light wavelength range for transmission and reception of data and control information.

ii) Polarization for transmission and reception: This may mean a polarization direction for transmission and reception of data and control information. For example, it may be agreed between the transmitting UE and receiving UE that data and control information is exchanged based on only vertical polarization for interference control.

iii) OAM mode for transmission and reception: This may mean an OAM mode index for transmission and reception of data and control information.

iv) Baseband modulation for transmission and reception: This may mean a baseband modulation method for transmission and reception of data and control information. For example, for data modulation and demodulation, i) an OOK method may be used for single carrier modulation, or ii) an OFDM method may be used as for multi-carrier modulation, which may be agreed between the transmitting UE and receiving UE.

Figure 16:
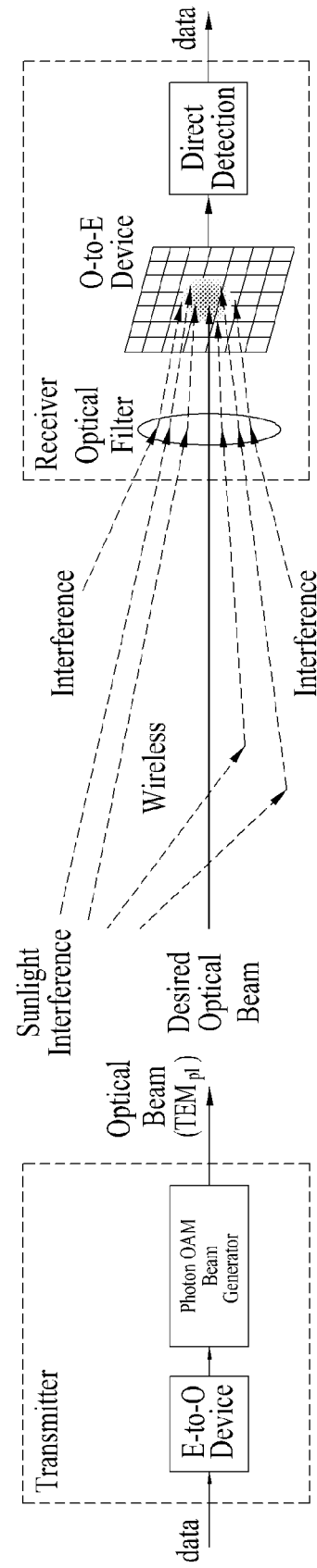

2. Optical Wireless Communication Transmitter and Receiver Based on Photon OAM 2.1. Transmitting UE and Receiving UE in OAM-Based Optical Wireless Communication In an example or implementation of the present disclosure shown in FIG. 16, proposed is a system including: i) a transmitting UE transmitting a signal based on a photon OAM beam generator; and ii) a receiving UE using an optical filter for distinguishing a desired OAM beam from optical interference. According to the proposed system, it is possible to minimize interference from sunlight or other sources having the same band and same polarization as those of a desired optical beam.

If radio light is interpreted as an electromagnetic wave, the TEM mode may be classified depending on to the shape of a beam. The basic form of the TEM mode is generally a Gaussian beam, which is represented by $TEM_{00}$. Hermite-Gaussian (HG) modes with rectangular transverse mode patterns are represented by $TEM_{mn}$. LG modes with cylindrical transverse mode patterns are represented by $TEM_{pl}$. In an example or implementation of the present disclosure, the LG modes ($TEM_{pl}$) may be represented by photon OAM.

2.2. Transmitting UE

A transmitting UE may convert an electric source including data to be transmitted into an optical source with an E-to-O device. The converted optical source may be converted into a photon OAM beam by a photon OAM beam generator as follows.

i) The transmitting UE may convert the optical source into a Gaussian beam ($TEM_{00}$) by passing the optical source through a resonator and then convert the Gaussian beam into the photon OAM beam ($TEM_{pl}$) with a spiral phase plate.

ii) The transmitting UE may convert the optical source to a Gaussian beam ($TEM_{00}$) by passing the optical source through a resonator, and convert the Gaussian beam into the photon OAM beam ($TEM_{pl}$) by reflecting the Gaussian beam on a phase hologram with a spiral phase pattern.

iii) The transmitting UE may convert the optical source to a Gaussian beam ($TEM_{00}$) by passing the optical source through a resonator and convert the Gaussian beam into the photon OAM beam ($TEM_{pl}$) by reflecting the Gaussian beam on a phase hologram with a fork diffraction pattern.

iv) The transmitting UE may convert the optical source to a Hermite-Gaussian beam (TEMmn) by passing the optical source through a resonator and convert the Hermite-Gaussian beam into the photon OAM beam (TEMpl) by passing the Hermite-Gaussian beam through a cylindrical lens HG-LG mode converter (e.g., pi/2 mode converter).

In addition to methods i) to iv) described above, various methods capable of generating a photon OAM beam may be applied to examples or implementations of the present disclosure.

2.3. Receiving UE 2.3.1. Optical Filter

An optical filter provided in a receiving UE may include a general optical filter or a polarizing filter. The general optical filter is an optical element for receiving a band corresponding to a desired optical beam. The optical filter may include a filter that transmits with a constant transmittance regardless of wavelengths, a correction filter that controls light intensity in a specific wavelength range, and a light contrast filter. The optical filter may be classified into an infrared range filter, a visible range filter, an ultraviolet range filter, a vacuum ultraviolet range filter, and so on depending on frequency ranges. Filters in each range may have different materials and structures.

Alternatively, the optical filter may be a polarized light filter (polarization filter). The polarization filter is a filter based on polarization, i.e., a filter for passing only light vibrating in a specific direction in order to receive polarized light corresponding to a desired optical beam. In general, polarization mainly occurs when obliquely projection light is reflected from a uniform surface. Therefore, if the polarization filter is used to block light reflected from the surface of a glass window or object, a clear and sharp image may be obtained. For example, a camera has a polarization filter capable of adjusting and rotating a polarization direction. If an autofocus camera uses the polarization filter, the autofocus camera may not recognize light and thus lose a focus because only wavelengths vibrating in one direction remain. A solution to this phenomenon is a circular polarization filter.

2.3.2. Lens

A lens is a device for focusing a received optical source to a focal point based on the effect of refraction.

2.3.2.1. Focal Point Control Based on Wavelength

Figure 17:
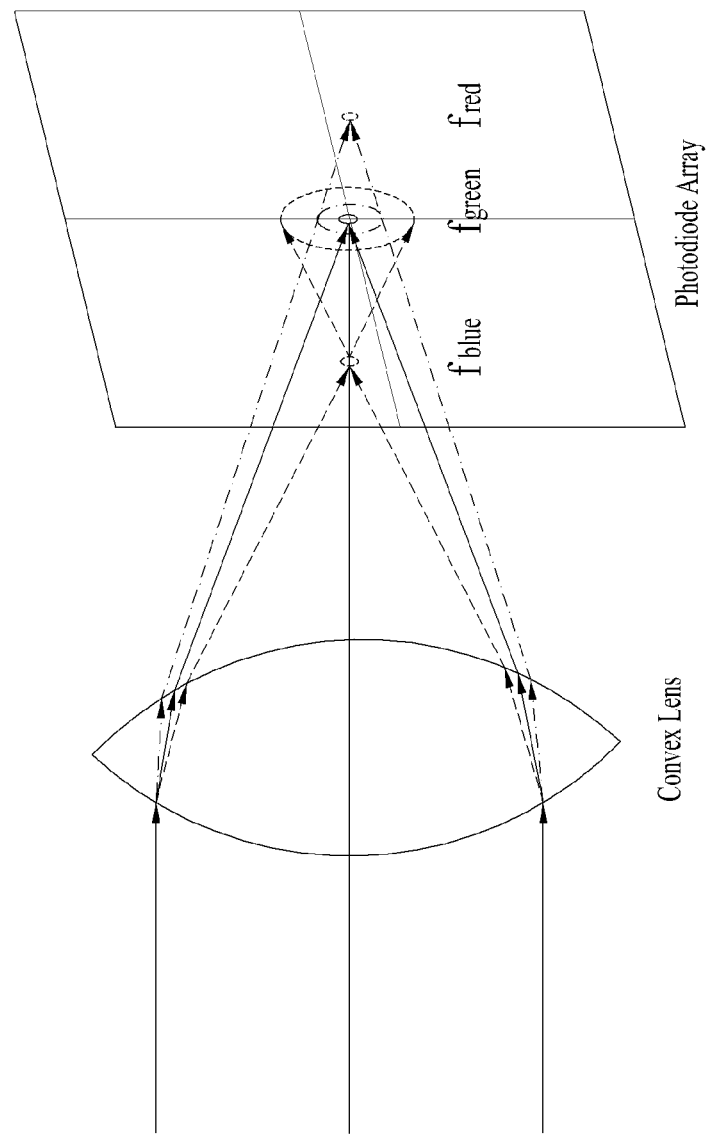
FIGS. 17 to 21 are diagrams for explaining optical filters applicable to an optical wireless communication systems according to an example or implementation of the present disclosure and acquisition of a desired beam using the same.

Referring to FIG. 17, an optical source passing through a convex lens or a Fresnel lens has different focal points depending on wavelengths. Based on this characteristic, the receiving UE may control the intensity concentration of the optical source received on a photodiode array. The photodiode array according to an example or implementation of the present disclosure refers to an array in which a plurality of light receiving elements performing O-to-E conversion are distributed in a specific area.

For example, when the focal point of green light is denoted by $f_{green}$ in FIG. 17, the focal points of blue light and red light are $f_{blue}$ and $f_{red}$, respectively. It may be seen that the blue light, green light, and red light have different focal points. Based on this characteristic, the receiving UE may control the intensity of green light to be concentrated at the center of the photodiode array, the intensity of red light to spread over a larger area, and the intensity of blue light to spread over a further larger area.

Based on the above control, the receiving UE may receive a green light signal at the focal point of the green light more efficiently. The receiving UE may control focal points depending on wavelengths by i) controlling the thickness of the convex lens or Fresnel lens or ii) controlling the distance between the convex lens and the photodiode array.

2.3.2.2. Focal Point Control Based on OAM Mode

Figure 18:
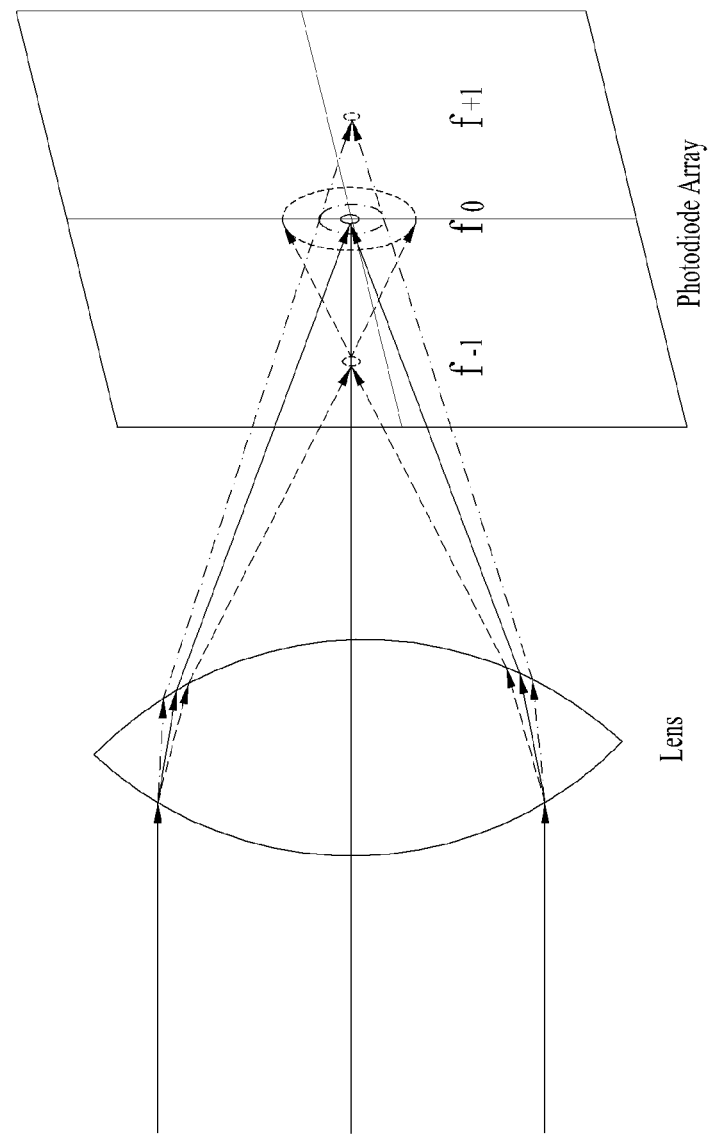

Referring to FIG. 18, an OAM optical source passing through a lens with an arbitrary refraction angle (e.g., Fresnel lens) has different focal points depending on mode indexes. Based on this characteristic, the receiving UE may control the intensity concentration of OAM modes received on the photodiode array.

For example, it may be seen from FIG. 18 that OAM mode +1, OAM mode 0, and OAM mode −1 have different focal points. In OAM mode 0, the receiving UE may control the intensity to be concentrated at the center of the photodiode array. In OAM mode −1, the receiving UE may control the intensity to spread over a larger area. In OAM mode +1, the receiving UE may control the intensity to spread over a further larger area.

When the focal point of OAM mode 0 is $f_0$, the focal point of mode index m, $f_m$ may be approximated as follows: $f_m = f_0 (1+C \cdot m)$, where constant C is an OAM dispersion coefficient.

The receiving UE may control the focal points of OAM modes by i) controlling the thickness of the lens or Fresnel lens or ii) controlling the distance between an arbitrary lens and the photodiode array.

2.3.3. Fresnel Zone Plate

A Fresnel zone plate is a device for focusing a received optical source to a focal point based on the effect of diffraction. Specifically, the zone plate or Fresnel zone plate is a device for focusing materials with light or wave characteristics. Unlike lenses or curved mirrors, the zone plate may use diffraction instead of reflection and refraction. The zone plate consists of a set of radially symmetric rings that alternate between opaque and transparent areas, which is known as a Fresnel zone. Light hitting the zone plate is diffracted around an opaque area. The areas may be spaced apart so that diffracted light structurally interferes at a desired focal point to produce an image.

Figure 19:
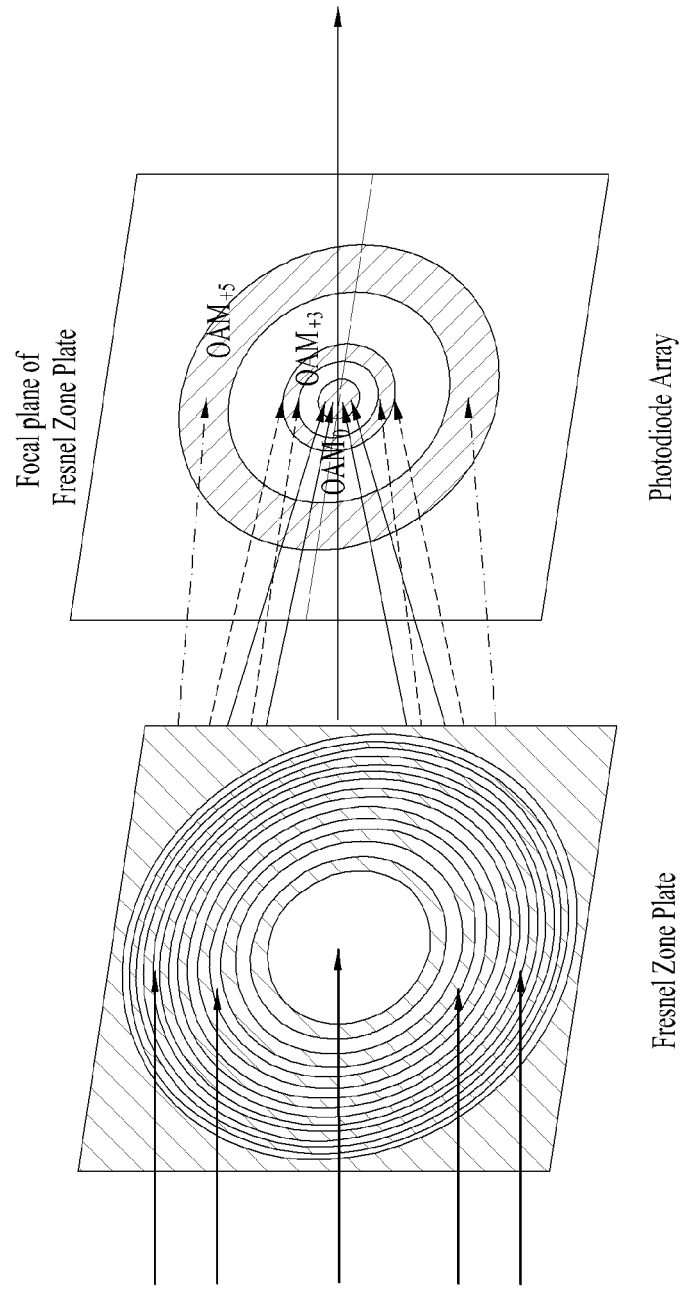

It may be seen from FIG. 19 that an optical source passing through the Fresnel zone plate have different wave characteristics or have different intensity distributions in a focal plane depending on OAM mode indexes. Based on these characteristics, the receiving UE may control the intensity distribution of the optical source received on the photodiode.

Referring to FIG. 19, when the optical source passing through the Fresnel zone plate is i) natural light such as sunlight or ii) plane wave light such as linearly polarized light or circularly polarized light, the intensity thereof may be concentrated at the center of the focal plane of the Fresnel zone plate.

When the optical source passing through the Fresnel zone plate is a plane wave light beam and a Gaussian beam, the intensity of the optical source may be distributed with a Gaussian distribution with respect to the center of the photodiode, which is located at the focal plane of the Fresnel zone plate.

When the optical source passing through the Fresnel zone plate is an LG beam corresponding to helical wave light, the intensity may be distributed in the form of a ring with respect to the center of the photodiode located at the focal plane of the Fresnel zone plate while maintaining the characteristics of an OAM state.

For example, in FIG. 19, OAM mode 0, OAM mode +3, and OAM mode +5 have different intensity distributions. In OAM mode 0, the receiving UE may control the intensity to be concentrated at the center of the photodiode with the Gaussian distribution. In OAM mode +3, the receiving UE may control the intensity to spread over a larger area in the form of a ring, In OAM mode +5, the receiving UE may control the intensity to spread over a further larger area in the form of a ring. In this case, for general plane wave light such as i) natural light such as sunlight and ii) linearly polarized or circularly polarized light, the intensity thereof may be concentrated in a very small area at the center of the photodiode. This area is smaller than the area in OAM mode 0 where the intensity is distributed at the center of the photodiode with the Gaussian distribution.

The receiving UE may control the intensity distribution of the optical source received on the photodiode by i) controlling a pattern according to the ring configuration of the Fresnel zone plate or ii) controlling the distance between the Fresnel zone plate and the photodiode.

2.3.4. Photon Sieve

A photon sieve is a device for focusing a received optical source to a focal point based on diffraction and interference effects. The photon sieve may include a flat sheet filled with pinholes arranged in a pattern similar to the ring of the Fresnel zone plate described above. The photon sieve may provide a much sharper focal point than the zone plate. The photon sieve is manufactured to include pinholes with various sizes and patterns and the characteristics of the focal point operation may vary depending on applications, so that the photon sieve may be used in various ways.

The receiving UE may control the intensity distribution of the optical source received on the photodiode based on i) wave characteristics of the optical source passing through the photon sieve or ii) the characteristic that the intensity distribution at the focal plane varies according to the OAM mode index.

When the optical source passing through the photon sieve is i) natural light such as sunlight or ii) plane wave light such as linearly or circularly polarized light, the intensity of the optical source may be concentrated at the center of the photodiode array located at the focal plane of the photon sieve.

When the optical source passing through the photon sieve is a plane wave light beam and a Gaussian beam, the intensity of the optical source is distributed with a Gaussian distribution with respect to the center of the photodiode array located at the focal plane of the photon sieve.

When the optical source passing through the photon sieve is an LG beam corresponding to helical wave light, the intensity may be distributed in the form of a ring with respect to the center of the photodiode array located at the focal plane of the photon sieve while maintaining the characteristics of an OAM state.

Figure 20:
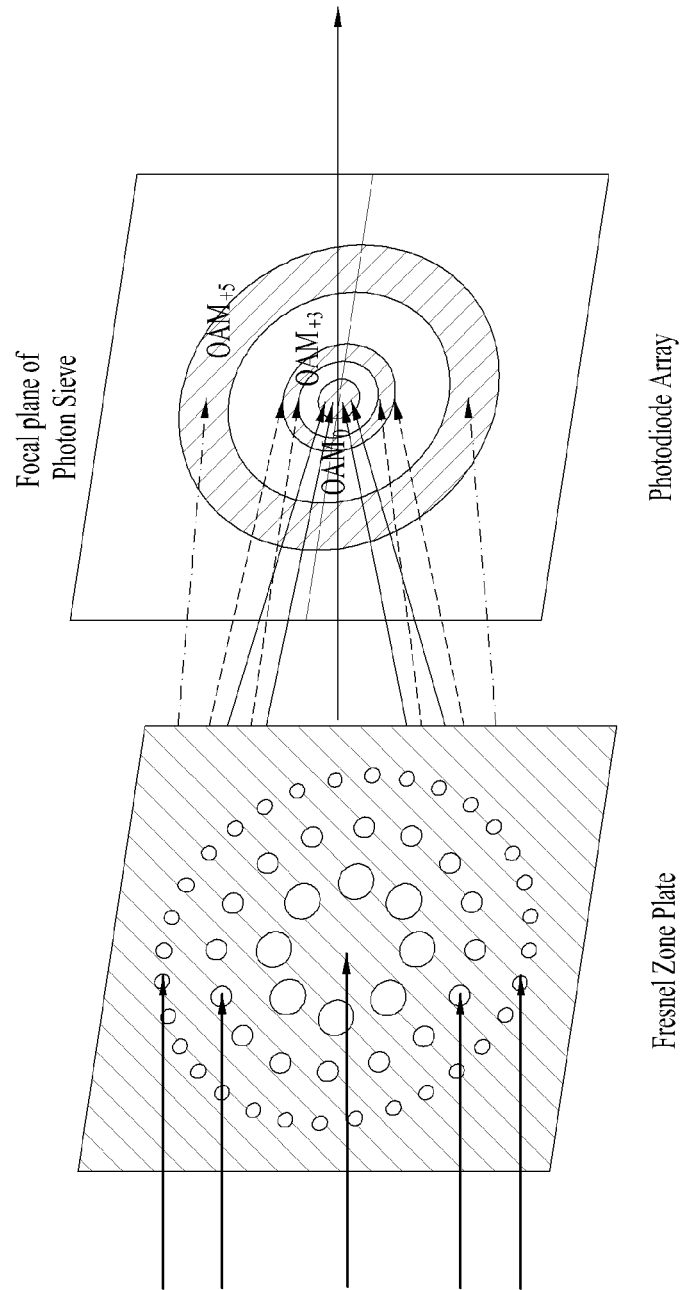

For example, in FIG. 20, OAM mode 0, OAM mode +3, and OAM mode +5 have different intensity distributions. In OAM mode 0, the receiving UE may control the intensity to be concentrated at the center of the photodiode with the Gaussian distribution. In OAM mode +3, the receiving UE may control the intensity to spread over a larger area in the form of a ring, In OAM mode +5, the receiving UE may control the intensity to spread over a further larger area in the form of a ring. In this case, for general plane wave light such as i) natural light such as sunlight, and ii) linearly polarized or circularly polarized light, the intensity thereof may be concentrated in a very small area at the center of the photodiode. This area is smaller than the area in OAM mode 0 where the intensity is distributed at the center of the photodiode with the Gaussian distribution.

The receiving UE may control the intensity distribution of the optical source received on the photodiode array by i) controlling a pattern according to the pinhole configuration of the photon sieve or ii) controlling the distance between the photon sieve and the photodiode array.

2.3.5. Phase Mask

A phase mask is a device for controlling a propagation direction according to the characteristics of a received optical source based on the effect of diffraction. The phase mask may include optical elements.

The receiving UE may control the position of the intensity distribution of the optical source received on the photodiode array based on i) the wave characteristics of the optical source passing through the phase mask (or pattern mask) or ii) the characteristic that the propagation direction of a beam changes depending on the OAM mode index.

Figure 21:
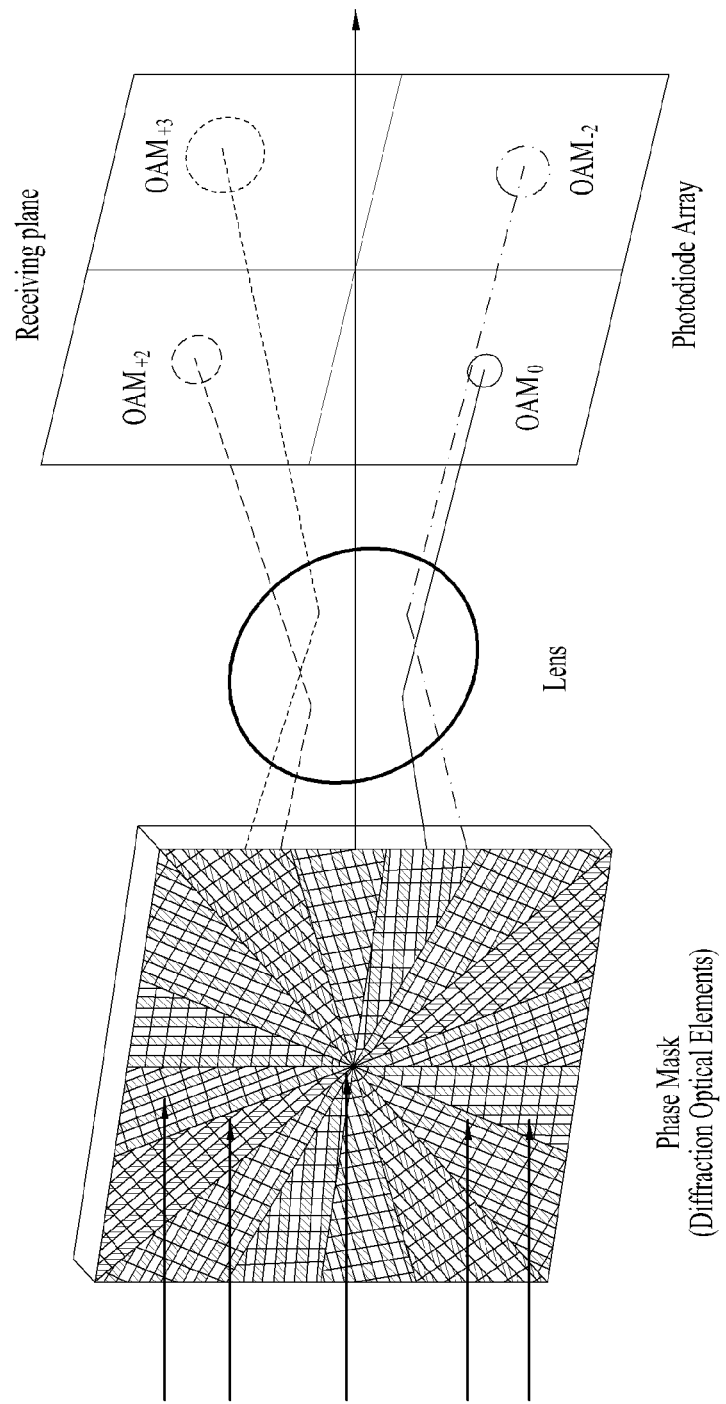

For example, it may be seen from FIG. 21 that OAM mode 0, OAM mode +2, OAM mode −2, and OAM mode +3 have different intensity distribution positions. In this case, since general plane wave light such as i) natural light such as sunlight and ii) linearly or circularly polarized light has the same phase characteristics as a plane wave of OAM mode 0, the intensity thereof may be distributed in the third quadrant of a receiving plane in which the intensity distribution of OAM mode 0 is located. On the other hand, a lens serves to focus the optical source passing through the phase mask on the receiving plane.

The position of the intensity distribution of an optical/photon resource may be controlled by controlling phase elements of the phase mask. In addition, the position of the intensity distribution of the optical/photon resource may be controlled by controlling the distance between an optical phase mask (phase pattern mask) received on the photodiode array and the photodiode array, the distance between the phase mask (phase pattern mask) and a lens, and the distance between the lens and the photodiode array.

To obtain characteristics presented through this specification in a composite manner, two or more optical filters may be used. For example, the receiving UE receives a specific wavelength through a general optical filter for controlling a received wavelength and then receives a desired polarization signal through a polarization filter. In addition, the receiving UE may operate by distinguishing between a plane wave mode and a spiral wave mode according to light wave characteristics of a signal received through the photon sieve.

3. Beam Divergence Depending on Characteristics of Optical/Photon Source

In general, radio light has beam divergence depending on the characteristics of an optical/photon source. In an example or implementation of the present disclosure, a method of selecting an OAM mode between a transmitting UE and receiving UE based on the beam divergence of radio light is proposed.

3.1. Divergence Angle of Gaussian Beam

Figure 22:
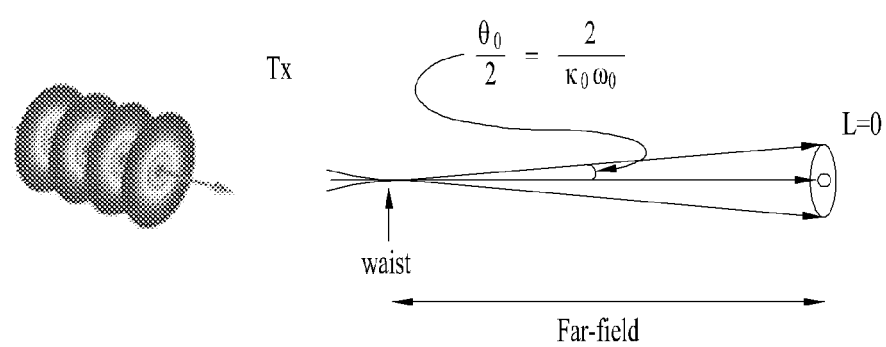
FIGS. 22 to 26 are diagrams illustrating selection of a photodiode area exceeding a threshold according to an example or an implementation example of the present disclosure.

FIG. 22 is a diagram for explaining the dispersion angle of a Gaussian beam in a far field. The dispersion angle of the Gaussian beam may be defined as shown in [Equation 2] below. In Equation 2, ko is a wave vector with a value of 2 pi/lambda, and wo is a minimum beam waist, which may vary depending on beam formation.

$$\frac{\theta_0}{2} = \frac{2}{k_0 w_0} = \frac{\lambda}{\pi w}, \quad \text{[Equation 2]}$$

It is assumed that M2 is set to 1 (M2=1) when the transmitting UE forms a beam by optimally designing an M2 factor. Referring to FIG. 22, i) when waist=658 um and wavelength=700 nm, angle=338.6 urad (i.e., 0.0194 degrees). In addition, ii) when waist=375 um and wavelength=400 nm, angle=338.6 urad (i.e., 0.0194 degree). In this case, the radius of the beam is 3.4 mm at a distance of 10 m (distance=10 m).

3.2. Divergence Angle of LG Beam

Figure 23:
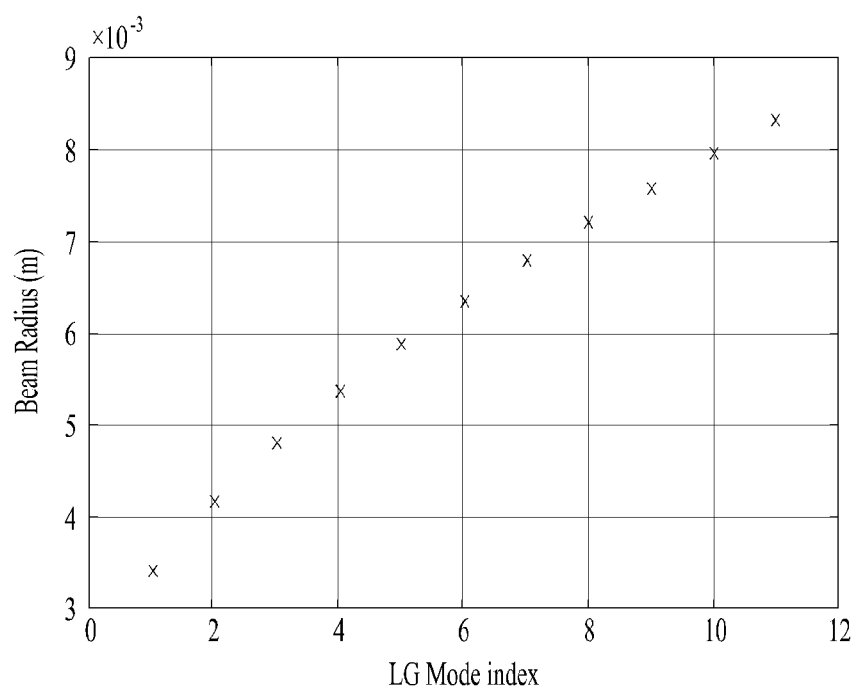
Figure 24:
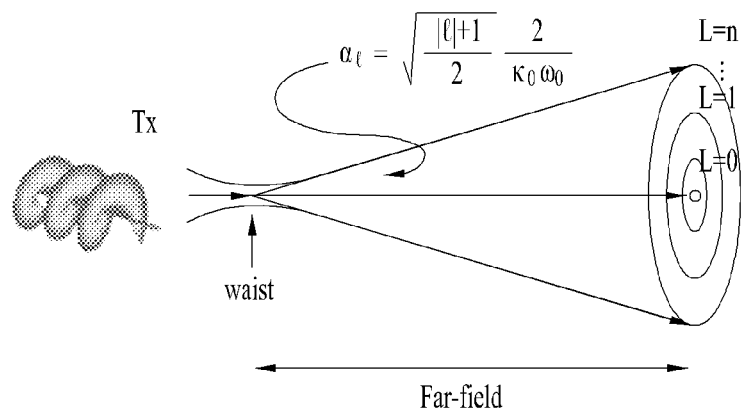

FIGS. 23 and 24 are diagrams for explaining the divergence angle of an LG beam in a far field. The divergence angle of the LG beam is defined based on [Equation 3] to [Equation 5] below. Specifically, [Equation 3] shows a case where wo is fixed, and [Equation 4] shows a case where $r_{rms}(O)$ is fixed. Here, ko is a wave vector with a value of 2 pi/lambda, and wo is a minimum beam waist, which may vary depending on beam formation. The relationship between $k_o$ and $w_o$ may be defined as shown in [Equation 5]

$$\alpha_\ell = \sqrt{\frac{|\ell|+1}{2}} \frac{2}{k_0 w_0} \quad \text{[Equation 3]}$$

$$\alpha_\ell = \frac{|\ell|+1}{k_0 r_{rms}(0)} \quad \text{[Equation 4]}$$

$$r_{rms}(0) = \sqrt{\frac{|\ell|+1}{2}} w_0 \quad \text{[Equation 5]}$$

Figure 25:
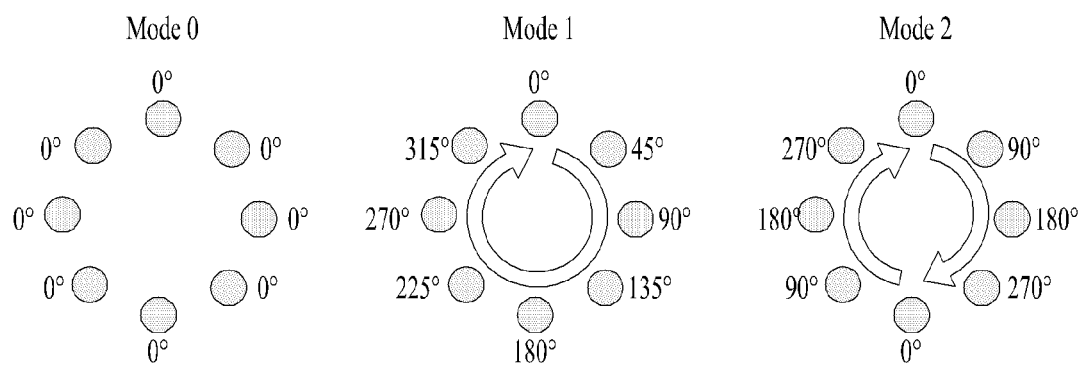

It is assumed that M2 is set to 1 (M2=1) when the transmitting UE forms a beam by optimally designing an M2 factor. Referring to FIG. 23, the radius of the beam may appear as shown in FIG. 23 at a distance of 10 m (distance=10 m) according to |l|. Referring to FIG. 24, in the case of an OAM beam, the beam radius may vary depending on OAM order 1. Also, the beam size (e.g., beam radius) at the receiving UE may vary depending on the distance between the transmitting UE and receiving UE. In addition, the phase characteristics of a received wavefront vary according to OAM order 1. For example, as illustrated in FIG. 25, a phase difference in an electric field (E-field) is generated according to the OAM order. The OAM order corresponds to the OAM mode described above.

Figure 26:
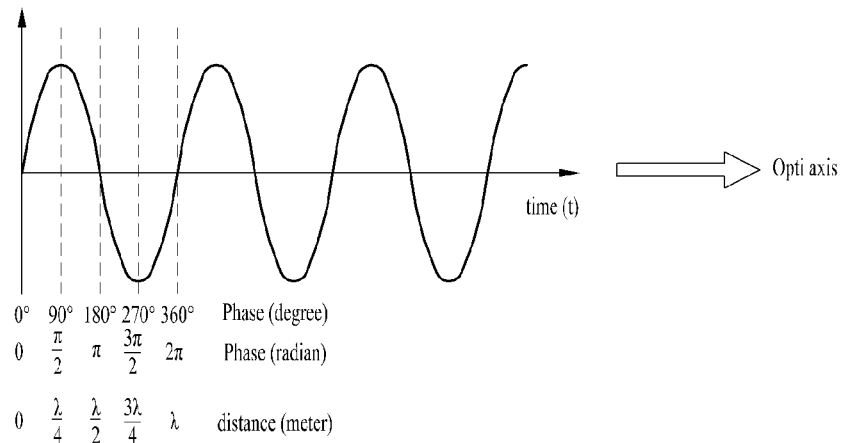
Figure 27:
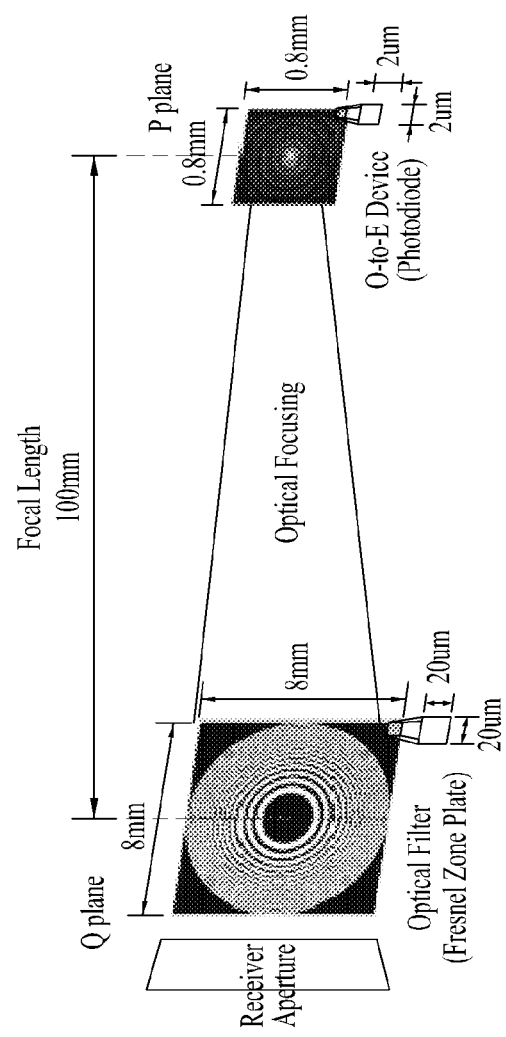
FIGS. 27 to 51 are diagrams illustrating the structure of a multi-filter transceiver according to an example or an implementation example of the present disclosure.

When the E-field is expressed in the form of a sine wave as illustrated in FIG. 26, a phase may mean a change of the E-field over time based on the traveling direction of a light source.

In FIG. 26, the y-axis (vertical axis) represents the vibration direction of the E-field. The vibration of the E-field illustrated over time may be expressed as illustrated in FIG. 26. As illustrated in FIG. 26, when the vibration of the E-field is illustrated over time, the x-axis (horizontal axis) may represent the movement direction of light. The time axis may be referred to as an optical axis. Through FIG. 26, a phase change of the light source over time may be expressed. The phase change is determined by a wavelength λ related to one cycle. Time t is a unit of movement of light and may be expressed as time t=λ/c when light travels a distance of one wavelength where c corresponds to the speed of light, which is about c=2.99792458*10^8 m/s.

As described above, the phase characteristics of the received wavefront vary according to OAM order 1. Therefore, a receiver (or the receiving UE) should perform coherent combining while performing phase compensation. In addition, decoding performance of the receiver may be increased by the design of the receiver.

In all of the data transmission methods described above, it may be difficult to guarantee the decoding performance of the receiver due to an influence from an external interference light source. In particular, interference from strong sunlight may significantly reduce the decoding performance of the receiver. Hereinafter, a transmission and reception method of wireless optical communication which is more robust against external interference will be proposed.

Specifically, as a method of distinguishing between a desired signal from interference in wireless optical communication, a method for optimizing an SNR based on an arbitrary threshold and a method of distinguishing interference based on multiple optical filters will be proposed below.

4.1 Selection of Photodiode (PD) Region Exceeding Threshold

Figure 28:
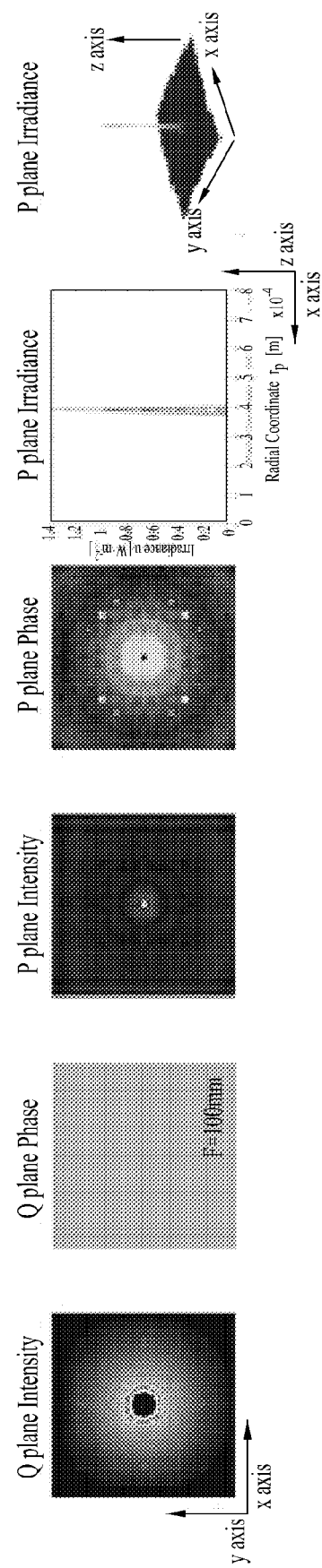

FIG. 26 illustrates the structure of a receiving UE for distinguishing between a desired signal from interference in wireless optical communication based on a description of "2. Optical Wireless Communication Transmitter and Receiver Based on Photon OAM". Referring to FIG. 26, an optical filter and an O-to-E device may be used for the structure of the receiving UE. In an example of FIG. 26, a Fresnel zone plate may be used as the optical filter, and a PD may be used as the O-to-E device. The PD may be configured in the form of an array, width*height of which is 400*400. In a 400×400 PD array, which is the O-to-E device, the size of a single PD may be 2 um×2 um. When a Gaussian beam is incident on a receiver aperture of FIG. 26, characteristics as illustrated in FIG. 28 may appear.

Figure 29:
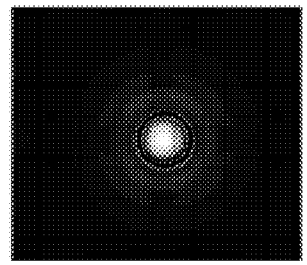
Figure 29:
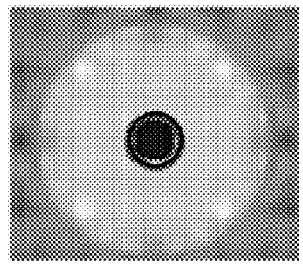

The intensity of the Gaussian beam has Gaussian characteristics. The phase of the Gaussian beam has isophase wavefront characteristics having plane wave characteristics. In views showing intensity in FIG. 28, a relatively bright portion indicates that the intensity of light is relatively high, and a relatively dark portion indicates that the intensity of light is relatively low. In views showing phase in FIG. 28, it may be assumed that gray is Phase=0, black is Phase=π, and white is Phase=−π. When a signal of a transmitter is a plane wave in which the phase of a wavefront is an isophase as an optical beam transmitted through an E-to-O device, the phase of the wavefront shown in the two-dimensional plane of (x, y) is as illustrated in the second view from the left in FIG. 28. Referring to the third and fourth views from the left in FIG. 28, an area in which intensity is valid in the P plane is a part of an entire area. Phase characteristics in the area in which intensity is valid have isophase characteristics like the Gaussian beam. In other words, the phase characteristics in the area in which intensity is valid have the characteristics of the plane wave. Views related to P plane irradiance in FIG. 28 show the magnitude of intensity in the P plane in two dimensions and three dimensions, respectively. Enlarged views related to the P plane in FIG. 28 (third and fourth views from the left in FIG. 28) may be as illustrated in FIG. 29.

Based on the characteristics described in Section 4.1, a valid area may be extracted from the PD array. The valid area may be expressed as a valid PD area. Extraction of the valid area may be performed by selecting the valid area based on the magnitude of absolute and/or relative irradiance through a reference signal. For example, assuming that P_irr denotes an irradiance power that a PD may have, a set of PDs positioned in a region in which the irradiance power exceeds a threshold may be determined as the valid area.

Figure 30:
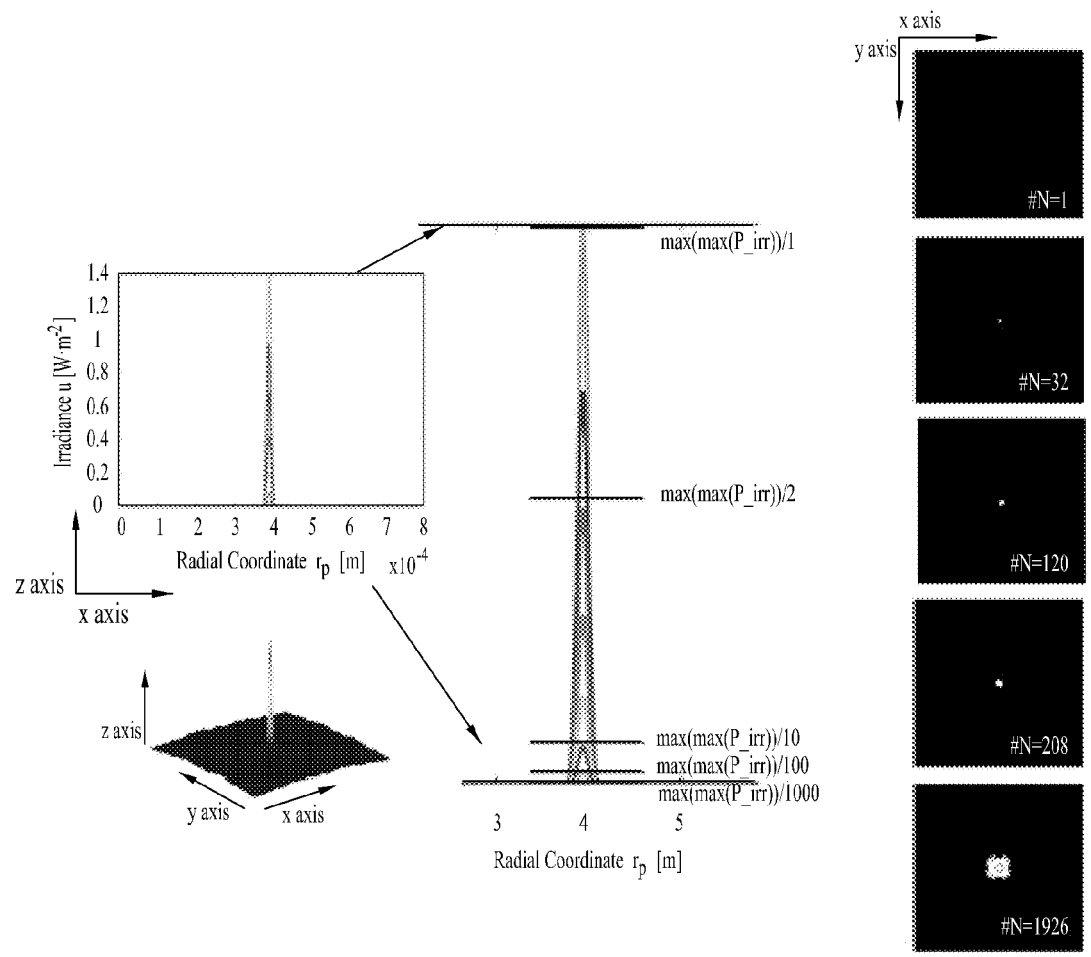

In FIG. 30, the threshold may be, for example, max(max (P_irr))/1-eps. Here, eps is a very small positive real number predefined by the system and may be used when all PDs except for a PD having the largest P_irr value are configured not to exceed the threshold. In other words, the threshold may be determined as a value smaller by eps than the largest P_irr value that PDs belonging to the entire PD array existing in the two-dimensional plane may have. A PD exceeding the threshold becomes the PD having the largest P_irr value in the two-dimensional plane. Accordingly, only the PD having the largest P_irr value in the two-dimensional plane is selected as the valid area. Referring to an example of FIG. 30, the number, #N, of valid PDs exceeding the threshold is 1. The threshold may vary with a system environment.

For example, in the example of FIG. 30, the threshold may be max(max(P_irr))/2-eps. In other words, the threshold may be determined as a value smaller by eps than ½ of the largest P_irr value that PDs belonging to the entire PD array existing in the two-dimensional plane may have. PDs exceeding the threshold are PDs having values within 3 dB based on the largest P_irr value in the two-dimensional plane. Accordingly, an area including PDs having the values within 3 dB based on the largest P_irr value in the two-dimensional plane is selected as the valid area. Referring to the example of FIG. 30, the number, #N, of valid PDs exceeding the threshold is 32.

As another example, in the example of FIG. 30, the threshold may be max(max(P_irr))/10-eps. In other words, the threshold may be determined as a value smaller by eps than ⅒ of the largest P_irr value that PDs belonging to the entire PD array existing in the two-dimensional plane may have. PDs exceeding the threshold are PDs having values within 10 dB based on the largest P_irr value in the two-dimensional plane. Accordingly, an area including PDs having the values within 10 dB based on the largest P_irr value in the two-dimensional plane is selected as the valid area. Referring to the example of FIG. 30, the number, #N, of valid PDs exceeding the threshold is 120.

In the example of FIG. 30, the threshold may be max (max(P_irr))/100-eps. In other words, the threshold may be determined as a value smaller by eps than ¹⁄₁₀₀ of the largest P_irr value that PDs belonging to the entire PD array existing in the two-dimensional plane may have. PDs exceeding the threshold are PDs having values within 20 dB based on the largest P_irr value in the two-dimensional plane. Accordingly, an area including PDs having the values within 20 dB based on the largest P_irr value in the two-dimensional plane is selected as the valid area. Referring to the example of FIG. 30, the number, #N, of valid PDs exceeding the threshold is 208.

In the example of FIG. 30, the threshold may be max (max(P_irr))/1000-eps. In other words, the threshold may be determined as a value smaller by eps than ¹⁄₁₀₀₀ of the largest P_irr value that PDs belonging to the entire PD array existing in the two-dimensional plane may have. PDs exceeding the threshold are PDs having values within 30 dB based on the largest P_irr value in the two-dimensional plane. Accordingly, an area including PDs having the values within 30 dB based on the largest P_irr value in the two-dimensional plane is selected as the valid area. Referring to the example of FIG. 30, the number, #N, of valid PDs exceeding the threshold is 1926.

Figure 31:
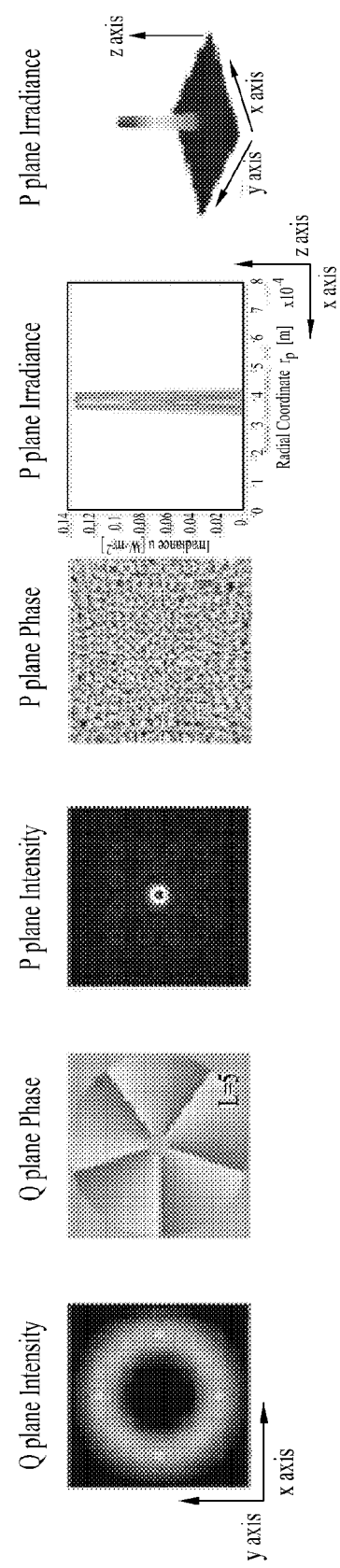

In Embodiment 4.1, when an LG beam (L=5) is incident on the receiver aperture, the receiver exhibits the characteristics as illustrated in FIG. 31.

Figure 32:
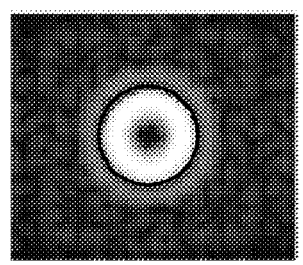
Figure 32:
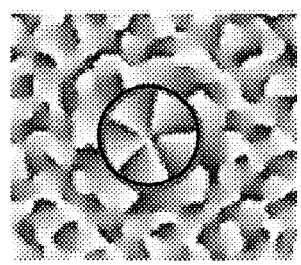

The intensity of the LG beam has doughnut (i.e., single ring) distribution, and wavefront characteristics of the LG beam have spiral characteristics. In views related to intensity in FIG. 31, a relatively bright portion indicates that the intensity of light is relatively high, and a relatively dark portion indicates that the intensity of light is relatively low. In views related to phase in FIG. 28, it may be assumed that gray is Phase=0, black is Phase=π, and white is Phase=−π. When the phase of a wavefront of an optical beam through an E-to-O device of a transmitter has a uniformly varying form with the spiral characteristics according to OAM order L, the phase of the wavefront shown in the two-dimensional plane is as illustrated in the second view from the left in FIG. 31. As such, an area in which intensity is valid in the P plane is a part of an entire area as illustrated in the third view from the left in FIG. 31. Phase characteristics in the valid area of the P plane show uniform phase variation characteristics like the LG beam as illustrated in the fourth view from the left in FIG. 31. For example, the phase characteristics in the valid area of the P plane exhibit spiral characteristics. A view related to irradiance of the P plane, which is the second view from the right in FIG. 31, depicts the magnitude of intensity of the beam in two dimensions. A view related to irradiance of the P plane, which is the first view from the right in FIG. 31, depicts the magnitude of intensity of the beam in three dimensions. Enlarged views related to the P plane in FIG. 31 may be as illustrated in FIG. 32.

Based on the characteristics described in Section 4.1, a valid area may be extracted from the PD array. The extraction of the valid area may be performed by selecting a specific area based on the magnitude of absolute and/or relative irradiance through a reference signal. For example, assuming that P_irr denotes an irradiance power received from and/or measured by a single PD, a set of PDs positioned in a region in which the irradiance power exceeds a threshold may be determined as the valid area.

Figure 33:
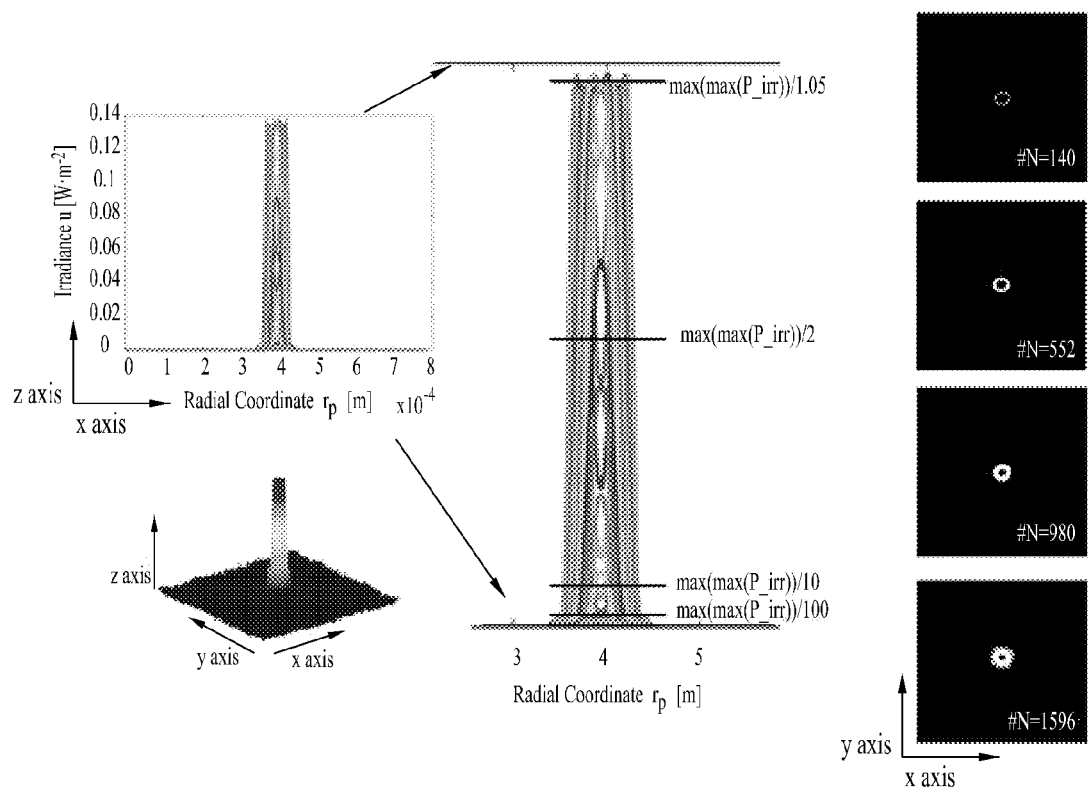

In FIG. 33, the threshold may be, for example, max(max (P_irr))/1.05-eps. In other words, the threshold may be determined as a value smaller by eps than 1/1.05 of the largest P_irr value that PDs belonging to the entire PD array existing in the two-dimensional plane may have. PDs exceeding the threshold are PDs having values within 0.2 dB based on the largest P_irr value in the two-dimensional plane. Accordingly, an area including the PDs having the values within 0.2 dB based on the largest P_irr value in the two-dimensional plane is selected as the valid area. Referring to an example of FIG. 33, the number, #N, of valid PDs exceeding the threshold is 140. The threshold may vary with a system environment. For coherent combining at the receiver, the valid area of the LG beam may be configured in the form of a ring so that the entire phase variation is included in the ring.

In the example of FIG. 33, the threshold may be max (max(P_irr))/2-eps. In other words, the threshold may be determined as a value smaller by eps than ½ of the largest P_irr value that PDs belonging to the entire PD array existing in the two-dimensional plane may have. PDs exceeding the threshold are PDs having values within 3 dB based on the largest P_irr value in the two-dimensional plane. Accordingly, an area including the PDs having the values within 3 dB based on the largest P_irr value in the two-dimensional plane is selected as the valid area. Referring to the example of FIG. 30, the number, #N, of valid PDs exceeding the threshold is 552.

Alternatively, in the example of FIG. 33, the threshold may be max(max(P_irr))/10-eps. In other words, the threshold may be determined as a value smaller by eps than ⅒ of the largest P_irr value that PDs belonging to the entire PD array existing in the two-dimensional plane may have. PDs exceeding the threshold are PDs having values within 10 dB based on the largest P_irr value in the two-dimensional plane. Accordingly, an area including the PDs having the values within 10 dB based on the largest P_irr value in the two-dimensional plane is selected as the valid area. Referring to the example of FIG. 33, the number, #N, of valid PDs exceeding the threshold is 980.

In the example of FIG. 33, the threshold may be max (max(P_irr))/100-eps. In other words, the threshold may be determined as a value smaller by eps than 1/100 of the largest P_irr value that PDs belonging to the entire PD array existing in the two-dimensional plane may have. PDs exceeding the threshold are PDs having values within 20 dB based on the largest P_irr value in the two-dimensional plane. Accordingly, an area including the PDs having the values within 20 dB based on the largest P_irr value in the two-dimensional plane is selected as the valid area. Referring to the example of FIG. 33, the number, #N, of valid PDs exceeding the threshold is 1596.

When the threshold is selected in Embodiment 4.1, characteristics varying with the threshold are as follows.

First, as the threshold is set to be higher, an SNR for an electrical signal after a beam reaches a PD is increased.

As the threshold increase, only an area having a high irradiance value is selected as the valid area. Accordingly, an entire reception size S of a desired signal is reduced. As the valid area decreases, a total noise N also decreases. Since only PDs corresponding to relatively large size of the desired signal are selected, the SNR is relatively increased. Interference as well as noise is equally reduced. Accordingly, there is an effect of increasing a signal-to-interference-plus-noise ratio (SINR).

As the threshold is set to be low, a coherent combining characteristic of the electrical signal after the beam reaches the PD is increased. As the threshold becomes lower, the valid area is expanded, so that the desired signal is detected through a large number of PDs. Thus, diversity gain and/or coherent combining gain may be generated through a plurality of PDs.

The valid area may include a single PD rather than a plurality of PDs. For example, an optical filter may be configured to extract the valid area according to selection of the threshold, and the single PD may receive a beam belonging to the extracted area. Through pre-definition of the valid area in a measurement or design step of the valid area through a reference signal, the SNR and/or SINR may be controlled by passing through a beam having irradiance of the P plane corresponding to the valid area through the optical filter and not passing through a beam having irradiance of the P plane which does not correspond to the valid area through the optical filter.

The valid area may be dynamically controlled using the optical filter. For example, the valid area may be dynamically changed according to a time-varying channel or environment based on the measurement of the valid area through the reference signal.

In addition, the valid area may be controlled through an electrical signal from a PD included in an area determined as the valid area in the PD array without using the optical filter. An electrical signal from a PD which is not included in the valid area may not be used.

4.2 Structure of Double Filtered Transceiver

When a double filtered transceiver is used, an effect may be obtained in interference cancellation and desired signal selection.

Figure 34:
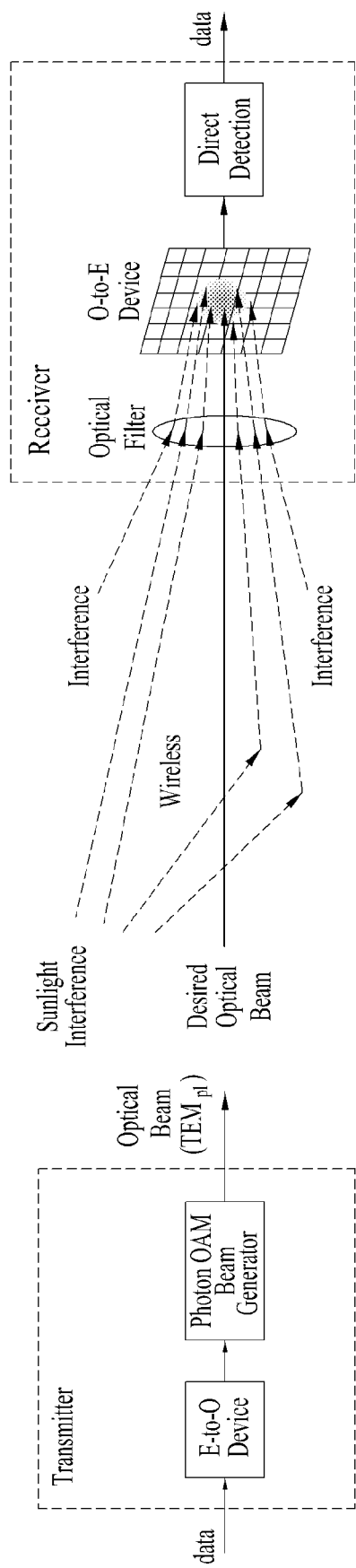

As described in Section 4.1, if the valid area for a desired signal is extracted based on an optical filter performing optical focusing, gain may be obtained in terms of the SNR and/or SINR. Hereinafter, a method of increasing the SINR by distinguishing between an interference signal and a desired signal through a plurality of optical filters will be proposed. FIG. 34 illustrates the structure of a receiver in which optical filters performing optical focusing are successively disposed.

Figure 35:
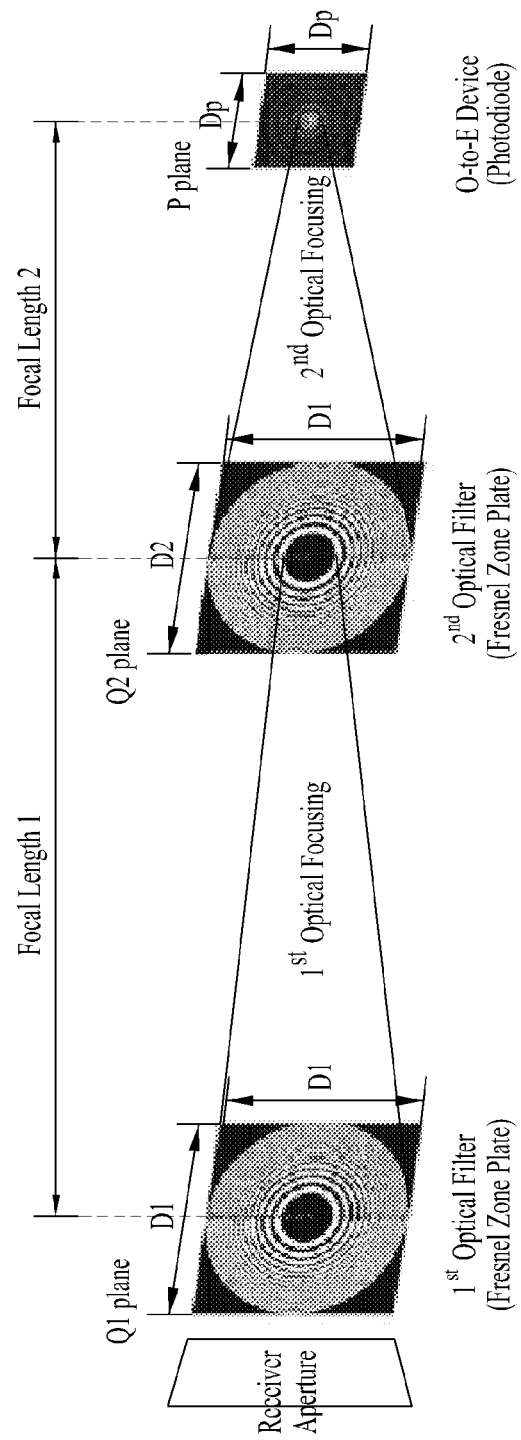

An example of the structure of FIG. 34 may be expressed as in FIG. 35. Referring to FIG. 35, after a desired signal and an interference signal are incident on a receiver aperture, the desired signal and the interference signal are focused on a second optical filter according to a wavefront characteristic of each signal in a first optical filter. The desired signal and the interference signal focused from the first optical filter on the second optical filter are focused from the second optical filter to an O-to-E device based on a wavefront characteristic after being focused.

Figure 36:
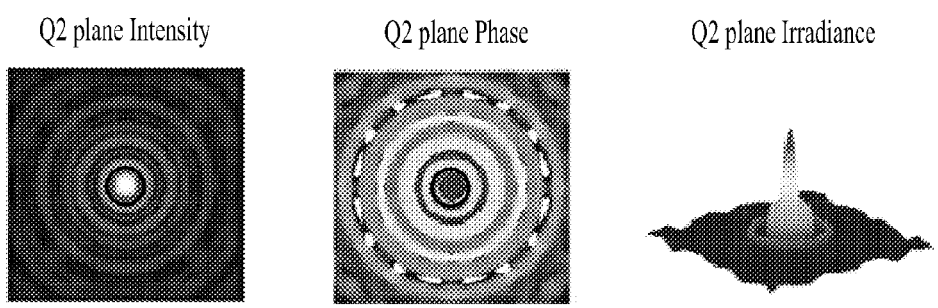
Figure 37:
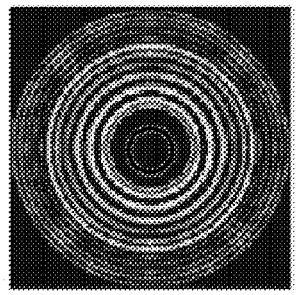
Figure 37:
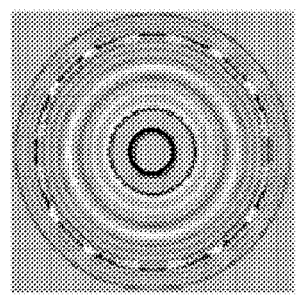
Figure 38:
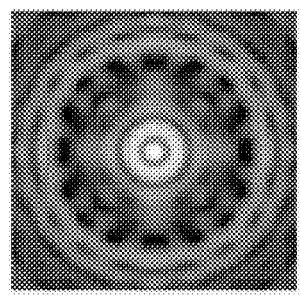
Figure 38:
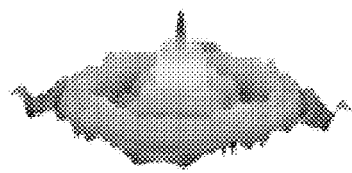

Sunlight has the characteristics of a plane wave and is incident on the receiver with uniform intensity. When sunlight is incident on a Q1 plane of FIG. 35 as an interference signal, sunlight exhibits characteristics as illustrated in FIG. 36 in a Q2 plane by first optical focusing. Referring to FIG. 36, an indicated area represents that the intensity of the interference signal is concentrated at a focus. In the area in which the intensity of the interference signal is concentrated, the characteristics of the plane wave still appear. When the interference signal passes through the filter again in the Q2 plane, the interference signal exhibits characteristics as illustrated in FIG. 37. Referring to FIG. 37, since the center of the optical filter of the Q2 plane is a closed space, the concentrated interference signal does not pass through the optical filter of the Q2 plane. Signals belonging to an out-of-focus area may still pass through the filter. Finally, the intensity and three-dimensional irradiance of the interference signal on the P plane are as illustrated in FIG. 38.

That is, although the intensity of the interference signal is focused on a specific area in the Q2 plane by focusing of the Q1 plane, the main intensity of the interference signal is not transmitted up to the P plane by the filter structure of the Q2 plane. Since only energy outside the specific area that is not focused on the Q2 plane is transmitted to the P plane, an interference weakening effect may be obtained.

Figure 39:
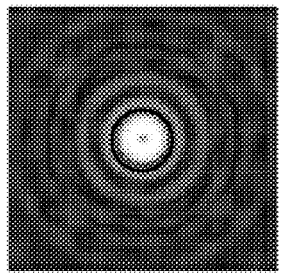
Figure 39:
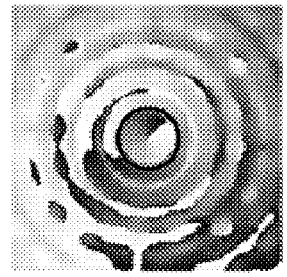
Figure 39:
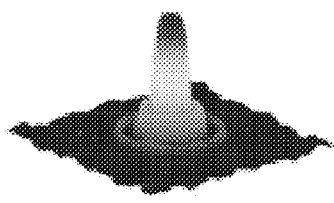
Figure 40:
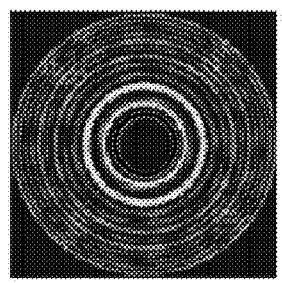
Figure 40:
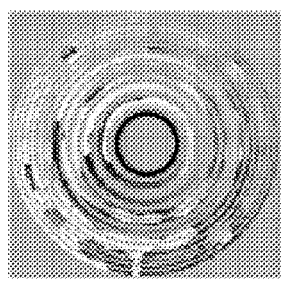
Figure 41:
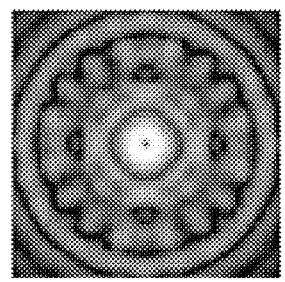
Figure 41:
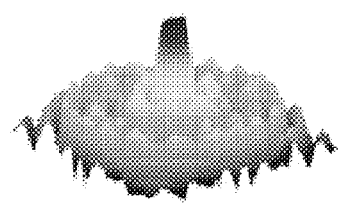

In the structure of FIG. 35, when an LG beam, which is the desired signal, is incident on the Q1 plane, the LG beam exhibits characteristics as illustrated in FIG. 39 in the Q2 plane by first optical focusing. The LG beam has, for example, L=1, a spiral wave characteristic, and intensity of a doughnut shape. Referring to FIG. 39, an indicated area represents that the intensity of the interference signal is concentrated at a focus. In the area in which the intensity is concentrated, the spiral wave characteristic of L=1 still appears. When the interference signal passes through the filter in the Q2 plane, characteristics change as illustrated in FIG. 40. That is, since the center of the optical filter of the Q2 plane is a closed space, a concentrated desired signal does not pass through the optical filter of the Q2 plane. Signals belonging to an out-of-focus area may still pass through the filter. Finally, the intensity and three-dimensional irradiance of the desired signal in the P plane are as illustrated in FIG. 41.

That is, although the intensity of the desired signal is focused on a specific area in the Q2 plane by focusing of the Q1 plane, the main intensity of the interference signal is not transmitted up to the P plane by the filter structure on the Q2 plane. Since only energy outside the specific area that is not focused on the Q2 plane is transmitted to the P plane, a weakening effect of the desired signal occurs. However, since the intensity from the focus is distributed in a donut shape, more energy is transmitted to the P plane as compared with the interfering signal. While a single filter may obtain a gain of 5.4 dB, the double filter may obtain an interference weakening gain of 8.7 dB so that an interference attenuation effect of 3.3 dB may be obtained.

Figure 42:
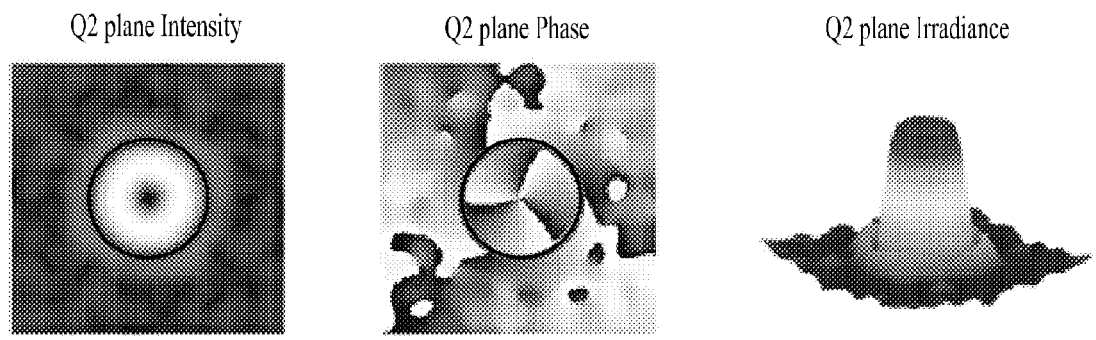
Figure 43:
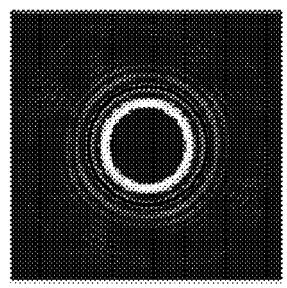
Figure 43:
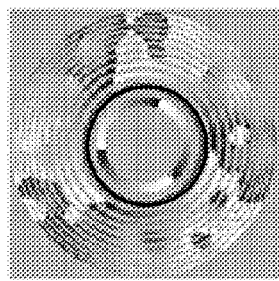
Figure 44:
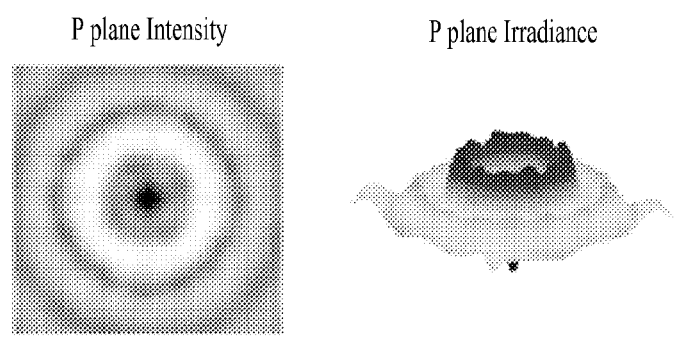

The incident LG beam may have, for example, L=3, a spiral wave characteristic, and intensity of a doughnut shape. When the LG beam, which is the desired signal, is incident on the Q1 plane, the LG beam exhibits characteristics as illustrated in FIG. 42 in the Q2 plane by first optical focusing. Referring to FIG. 42, an indicated area represents that the intensity of the interference signal is concentrated at a focus. In the area in which the intensity is concentrated, the spiral wave characteristic of L=3 still appears. When the interference signal passes through the filter in the Q2 plane, characteristics change as illustrated in FIG. 43. That is, although the center of the optical filter of the Q2 plane is a closed space, since a concentrated desired signal has the intensity of a larger doughnut shape than the closed space of the center portion, the concentrated desired signal may pass through the optical filter of the Q2 plane. Finally, the intensity and three-dimensional irradiance of the desired signal in the P plane are as illustrated in FIG. 44.

That is, the intensity of the desired signal is focused on a specific area in the Q2 plane by focusing of the Q1 plane, and the main intensity of the desired signal is focused again on the P plane by the filter structure of the Q2 plane. Since the intensity from the focus is distributed in a doughnut shape, a large quality of energy is transmitted to the P plane as compared with the interference signal. While a single filter may obtain a gain of 15.6 dB, the double filter may obtain an interference weakening gain of 22.6 dB so that an interference attenuation effect of 6.7 dB may be obtained.

Figure 45:
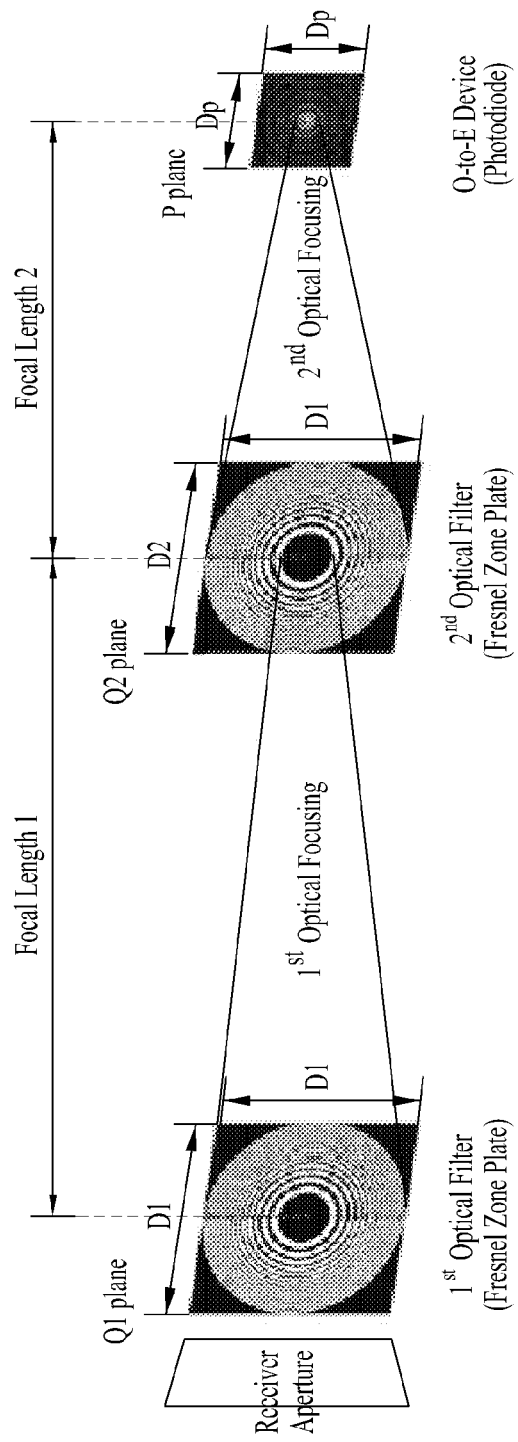

In the method proposed in Section 4.2, the arrangement of the optical filters capable of maximizing the desired signal while minimizing the interference signal may be configured according to a desired environment in a design step. In FIG. 35, D1 of the Q1 plane, focal length 1, D2 of the Q2 plane, focal length 2, and/or a Dp value of the P plane may be optimally configured. For example, as illustrated in FIG. 45, an optimal SINR and/or SNR in the P plane may be achieved by controlling D2 of the Q2 plane according to a degree to which the interference signal and the desired signal are focused through the first optical filter.

The arrangement of the optical filters capable of maximizing the desired signal while minimizing the interference signal may be dynamically controlled. For optimization, D1 of the Q1 plane, focal length 1, D2 of the Q2 plane, focal length 2, and/or the Dp value of the P plane may be dynamically configured. For example, an optical filter pattern of the Q1 plane or Q2 plane may be dynamically controlled using an optical element that changes by an electrical signal. Alternatively, the position of the Q1 plane or the Q2 plane may be mechanically controlled, so that the focal lengths may be controlled. In addition, focused degrees of the interference signal and the desired signal may be controlled by changing the position of the filters with respect to the focal lengths.

Figure 46:
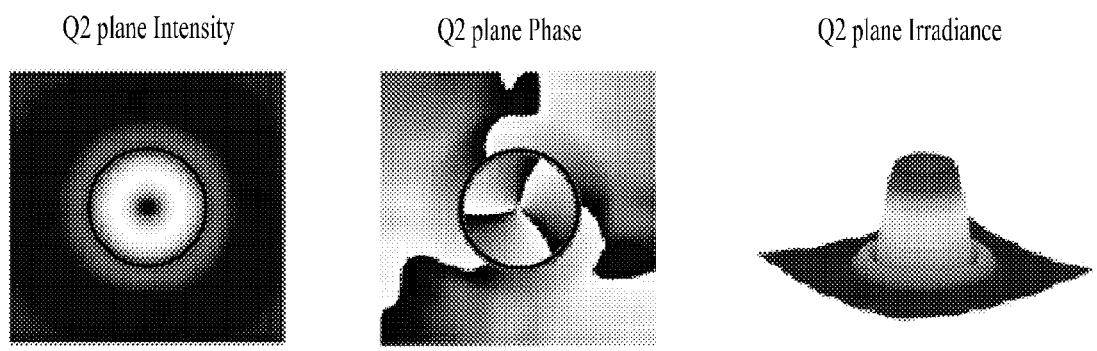
Figure 47:
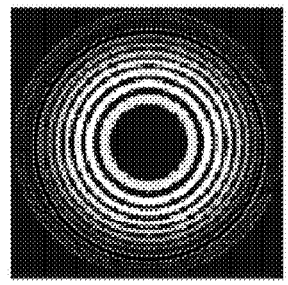
Figure 47:
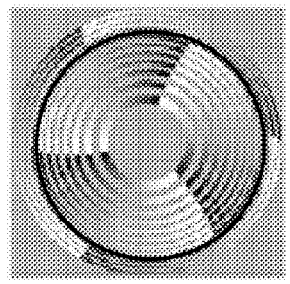
Figure 48:
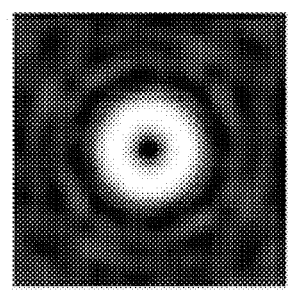
Figure 48:
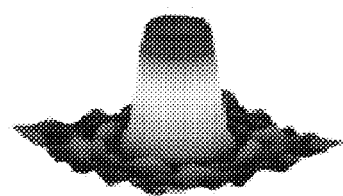

For example, it may be assumed that the size of the Q2 plane is reduced to half through optimization of the structure so that only the desired signal passes well. Then, when the LG beam (L=3), which is the desired signal, is incident on the Q1 plane, the LG beam exhibits characteristics as illustrated in FIG. 46 by first optical focusing. That is, as in an indicated area, the intensity of the desired signal is concentrated at a focus. In an area in which the intensity of the desired signal is concentrated, characteristics of the spiral wave with L=3 still appear. When the desired signal passes through the filter in the Q2 plane, the characteristics change as illustrated in FIG. 43. That is, although a central portion of the optical filter of the Q2 plane is a closed space, the concentrated desired signal has the intensity of a larger doughnut shape than the closed space of the center portion, so that the concentrated desired signal may pass through the optical filter of the Q2 plane. Finally, the intensity and three-dimensional irradiance of the desired signal in the P plane are as illustrated in FIG. 48.

That is, the intensity of the desired signal is focused on a specific area in the Q2 plane by focusing of the Q1 plane, and the main intensity of the desired signal is all focused again on the P plane by the filter structure of the Q2 plane. Since the intensity from the focus is distributed in a doughnut shape, most of energy is transmitted to the P plane as compared with the interference signal. While a single filter may obtain an interference weakening gain of 15.5 dB, the double filter may obtain an interference weakening gain of 31.2 dB so that an interference attenuation effect of 14.7 dB may be obtained.

Figure 49:
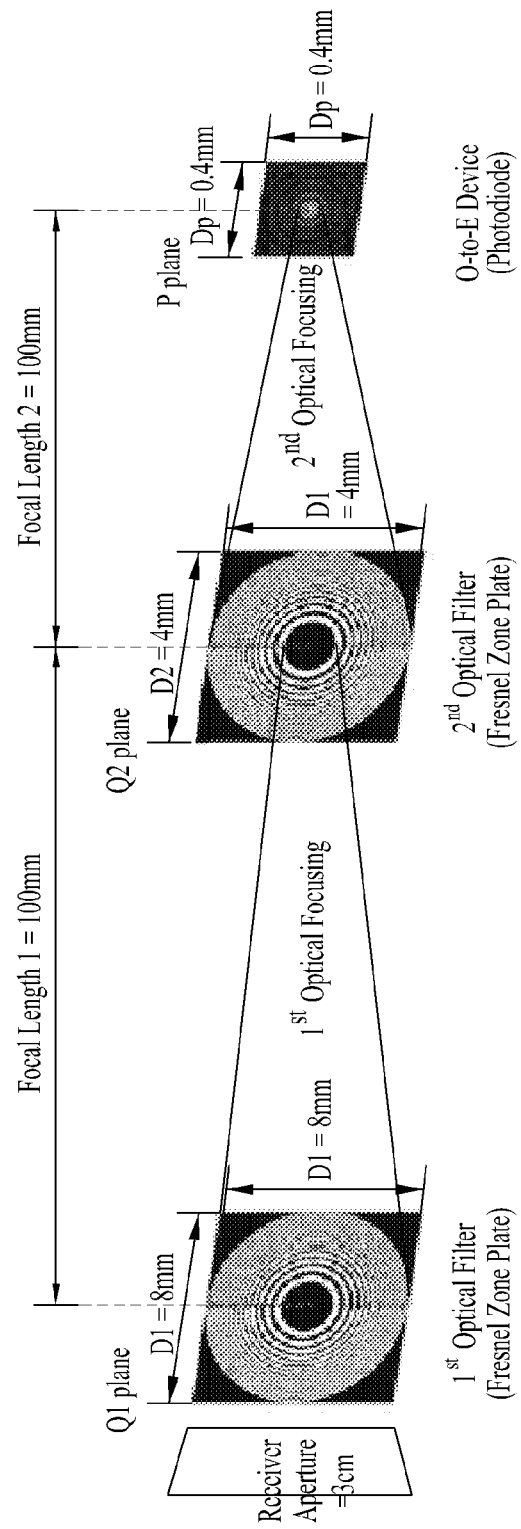

Assuming that a desired signal having a wavelength of 1550 nm is received, a double filtered OAM receiver may be configured as illustrated in FIG. 49. When a receiver aperture is 3 cm, D1 of the Q1 plane is 8 mm, focal length 1 is 100 mm, D2 of the Q2 plane is 4 mm, focal length 2 is 100 mm, and Dp of the P plane is 0.4 mm. If the size of D1 increases, D2 and Dp increase equally and have a linear relationship.

Figure 50:
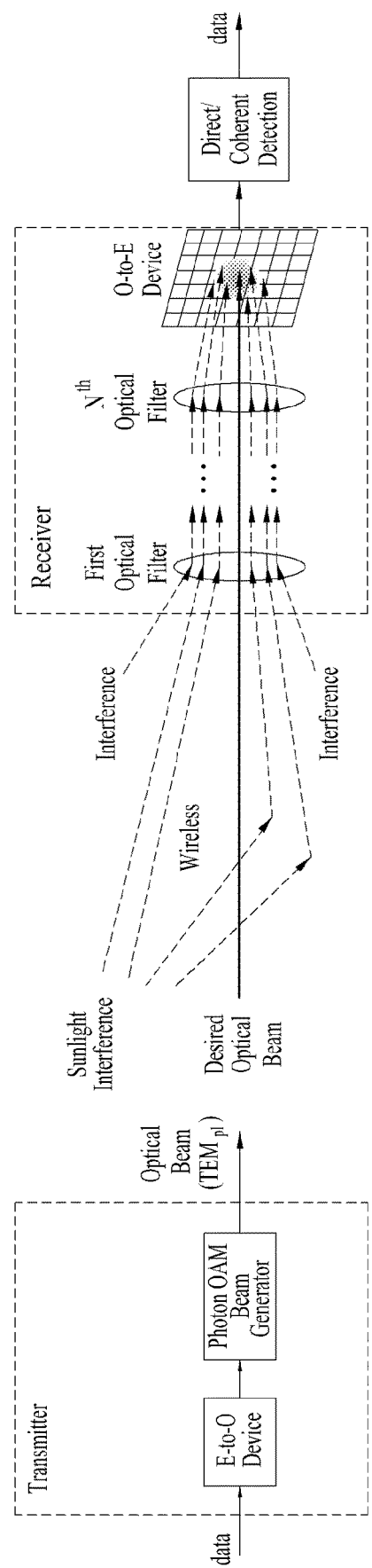
Figure 51:
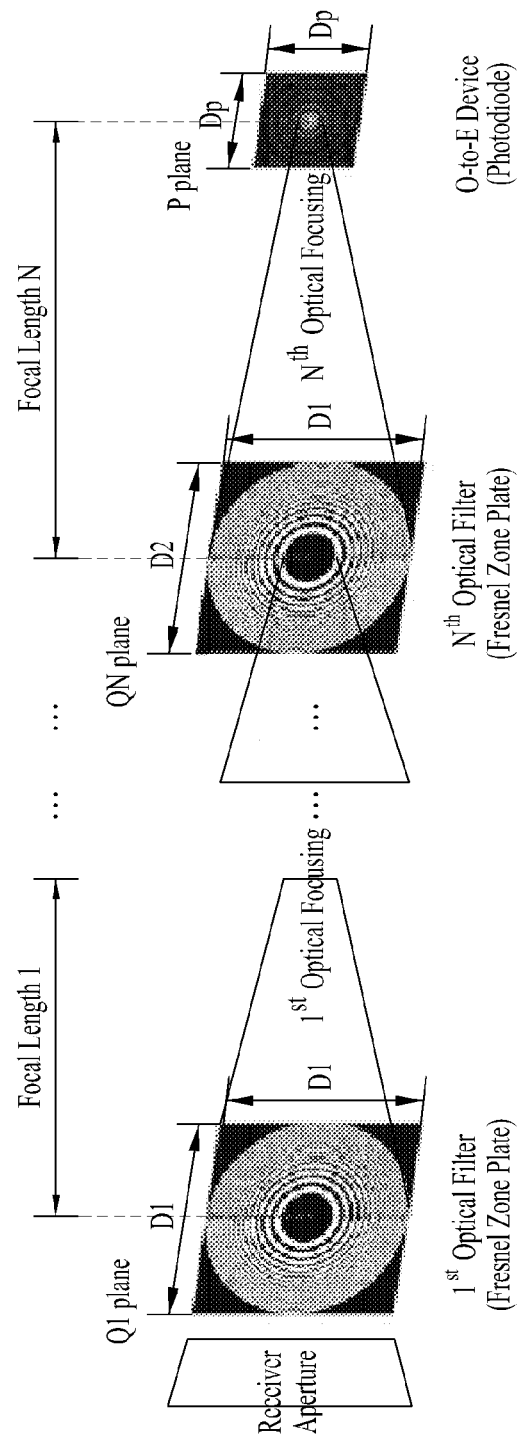

Similar to the above-described method, a technique for increasing the SINR by distinguishing between the interference signal and the desired signal through two or more optical filters is proposed. As illustrated in FIG. 50, a receiver structure in which a plurality of optical filters performing optical focusing are consecutively arranged at a receiver is proposed. An example of the structure in which a plurality of optical filters of the receiver is consecutively disposed may be represented as illustrated in FIG. 51.

In the proposed method, the arrangement of the optical filters capable of maximizing the desired signal while minimizing the interference signal may be configured according to the desired environment in the design step or may be dynamically configured. For optimization, DN of a QN plane, a focal length N, D2 of a Q2 plane, and/or a Dp value of a P plane may be optimally configured. N is a natural number of 1 or greater, indicating the number of filters.

Dynamic configuration of parameters for optimization may vary based on the environment of the receiver.

First, the parameters for optimization may be dynamically configured according to an interference level. In an environment with a high interference level, interference in the Q1 plane and the Q2 or higher plane should be reduced as much as possible. Therefore, in the environment in which the interference level is high, the focus of an interference beam is configured as in Equation 6 so that the focus of the interference beam is focused through first focusing in a closed space of an optical filter of the Q2 plane. The closed space of the optical filter corresponds to an area through which a beam is incapable of passing.

$$\min_{DN, Focal\ Length\ N} (\text{Interference Intensity on } QN \text{ and } P \text{ plane}) \quad \text{[Equation 6]}$$

The parameters for optimization may be dynamically configured according to distance. As the distance between a transmitter and a receiver decreases, the number of available OAM modes increases. This is because a beam distributed degree due to equatorial beam divergence is not large by a channel effect. That is, even a higher-order OAM mode may be used for a desired beam. In the case of the higher-order OAM mode, a focused optical beam in the Q1 plane has larger intensity distribution in the Q2 plane or higher. Therefore, as in Equation 7, the size of D2 in the Q2 plane or higher should be increased so that the desired beam may be received without loss.

$$\max_{DN} \text{(Desired Intensity on } QN \text{ and } P \text{ plane)} \qquad \text{[Equation 7]}$$

Whether to use a plurality of optical filters may be determined according to an interference level. In an environment with a high interference level, since interference attenuation requirements increase, the number of filters should be increased to reduce interference. If the number of filters increases, the size of the receiver may increase and implementation complexity may increase. For facilitation of implementation, a specific filter may be disabled while multiple filters are implemented. For example, the number of filters may be dynamically controlled using an optical element in which a filter is enabled when an electric field is applied and the filter is transparently disabled when an electric field is not applied. In addition, if a filter chain and a multi-filter chain are configured through a beam splitter, a received signal may be selectively applied to the single filter chain and the multi-filter chain based on the proposed configurations.

Figure 52:
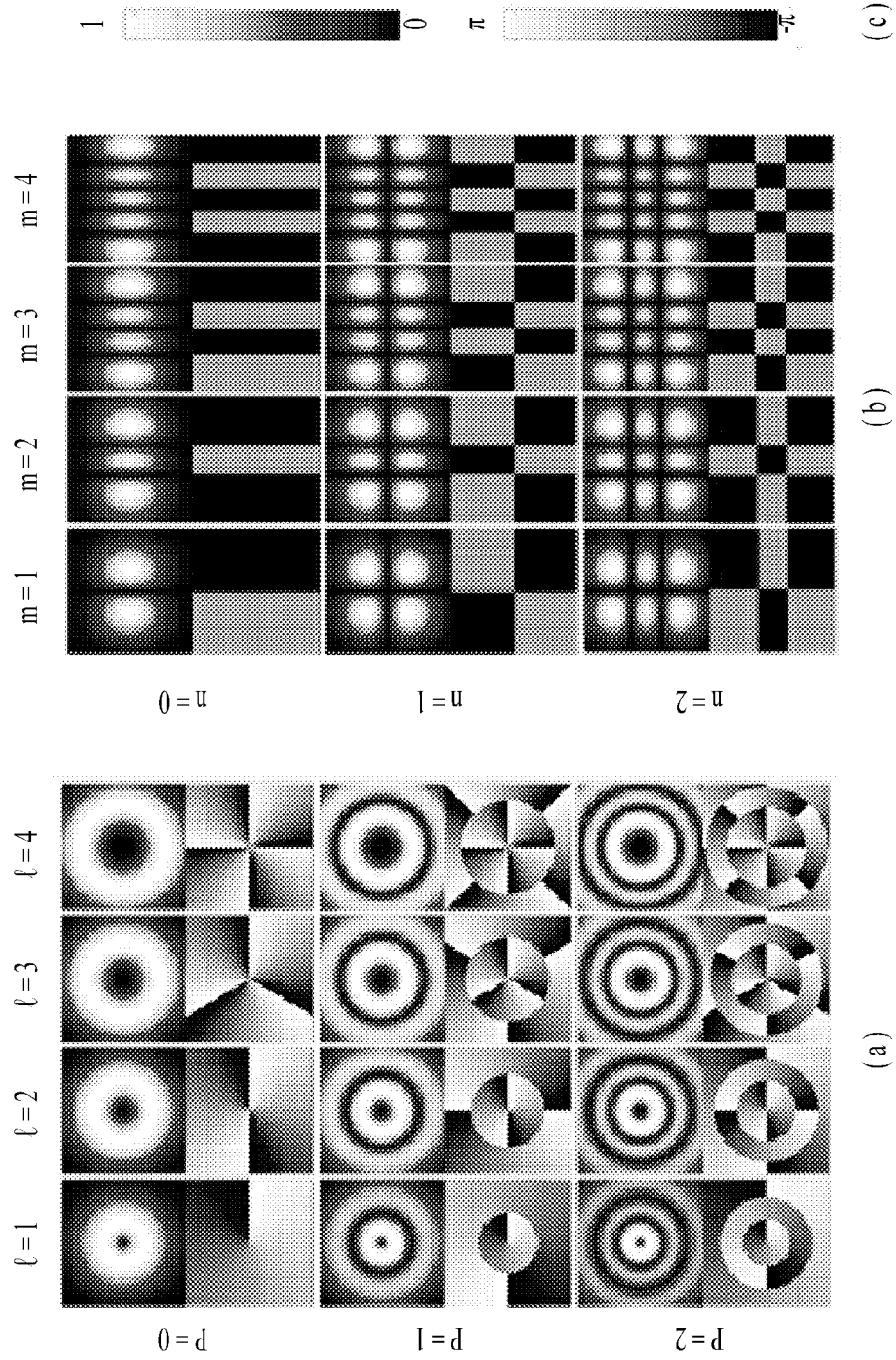
FIGS. 52 to 54 are diagrams for explaining use of multiple filters considering an interference level.

In the present specification, the LG beam and the OAM beam described in the technique of distinguishing between the interference signal and the desired signal by performing optical focusing based on the phasefront characteristics of an optical beam (or signal) may be equally applied even to other types of optical beams having the phasefront characteristics. For example, the interference signal and the desired signal may be distinguished by the method described in the present specification even with respect to HG modes and/or $TEM_{mn}$ having rectangular transverse mode patterns. In the case of an HG beam, the phasefront characteristics have rectangular phase change characteristics, rather than circular phase change characteristics like the LG beam. For example, as illustrated in FIG. 52, intensities and phases of the LG beam and the HG beam may be formed according to values of modes 'pl' and 'mn'.

Figure 53:
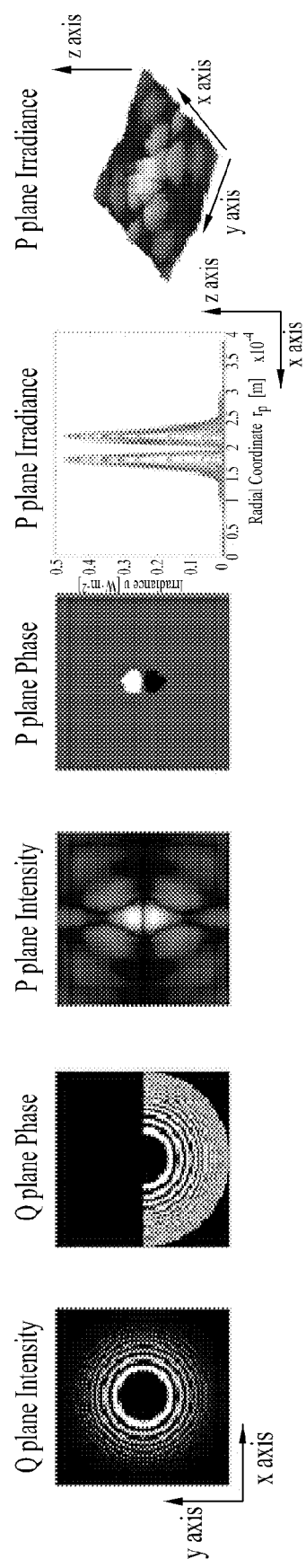

Accordingly, the HG beam of the desired signal may also be focused in the form illustrated in FIG. 53 after an optical filter performing optical focusing based on the phase characteristics described in the present specification. A plane on which the desired signal is focused after the optical filter may be a focal plane.

Accordingly, if there are phasefront characteristics having a phase difference, the embodiments described in the present specification may be applied even to all other types of optical beams.

Figure 54:
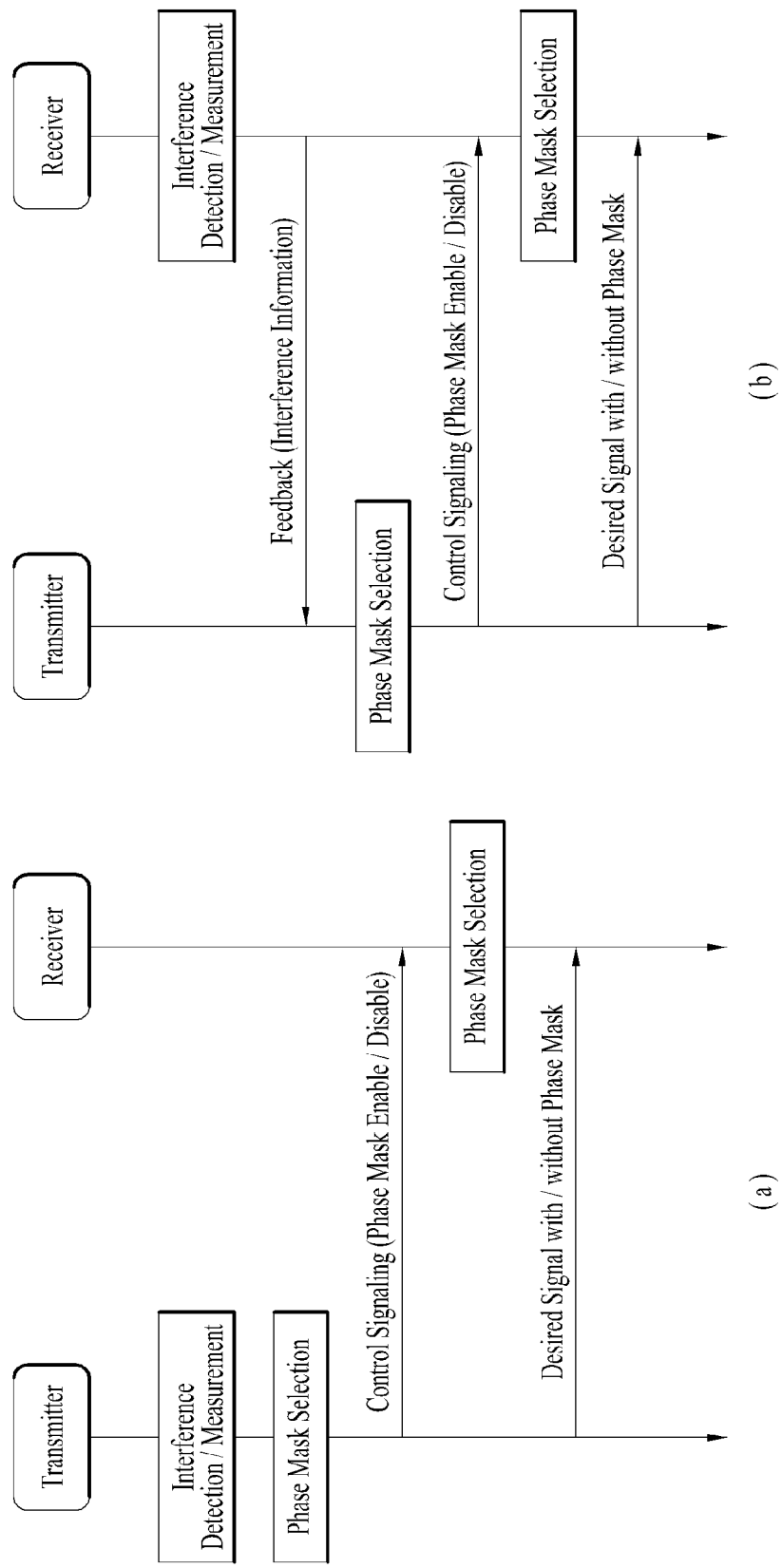

Whether to apply the embodiments described in the present specification may be dynamically determined depending on whether a communication device recognizes interference. For example, one or more operations of the embodiments described in the present specification may be initiated for interference cancellation and/or interference separation only when the transmitter and/or the receiver recognizes interference. When the transmitter and/or the receiver fails to recognize interference or the recognized size of interference is equal to or less than a threshold, one or more operations of the embodiments described in the present specification may not be performed. For example, an embodiment in which the transmitter and/or the receiver recognizes interference and an embodiment for determining whether to activate a specific operation in comparison with the threshold may be as illustrated in FIG. 54.

5.1 Selection of Transmission Mode Based on Interference Recognition 5.1.1 Selection of Transmission Mode Based on Interference Recognition at Transmitter 5.1.1.1. FIG. 54(a) illustrates an example in which a transmitter selects a phase mask by recognizing interference. The transmitter detects and/or measures interference using a predetermined method. The predetermined method may be, for example, a method of recognizing an optical source around a transmitter/receiver link in terms of energy detection in order to recognize interference.

5.1.1.2. The transmitter determines whether mode 0 for a desired signal is used based on recognized interference information. When there is less interference than a predefined threshold or there is no interference, an effect of interference on the desired signal is small even if mode 0 is not used, the desired signal may be decoded, so that mode 0 is used to transmit the desired signal.

5.1.1.3. Control information for wireless optical communication may be shared through a legacy link. The legacy link may include, for example, one or more of legacy wireless communication schemes such as LTE, LTE-A, NR, Wi-Fi, and Bluetooth. Alternatively, the control information for wireless optical communication may be shared by broadcasting a broadcast message through an optical source. The broadcast message may be, for example, a broadcast message of a predefined format, such as a PBCH or a common control channel of LTE/LTE-A. The control information for wireless optical communication may include information about whether mode 0 is used for the desired signal.

5.1.1.4. The Transmitter Transmits the Desired Signal Using Mode 0.

5.1.2. Selection of Transmission Mode Based on Interference Recognition at Receiver 5.1.2.1. FIG. 54(b) illustrates an example in which a receiver recognizes interference and selects a transmission mode. The receiver detects and/or measures interference by a predetermined method. The predetermined method may be, for example, a method of recognizing an optical source around a transmitter/receiver link in terms of energy detection in order to recognize interference.

5.1.2.2. The receiver may transmit and/or feed back recognized interference information to the transmitter. The interference information may be, for example, information about the size of quantized interference based on a predefined threshold and/or about the existence of interference.

5.1.2.3. The transmitter determines whether mode 0 for a desired signal is used based on received interference information. When there is less interference than a predefined threshold or there is no interference, an effect of interference on the desired signal is small even if a phase mask is not used, the desired signal may be decoded, so that mode 0 is used to transmit the desired signal.

5.1.2.3. Control information for wireless optical communication may be shared through a legacy link. The legacy link may include, for example, one or more of legacy wireless communication schemes such as LTE, LTE-A, NR, Wi-Fi, and Bluetooth. Alternatively, the control information for wireless optical communication may be shared by broadcasting a broadcast message through an optical source. The broadcast message may be, for example, a broadcast message of a predefined format, such as a PBCH or a common control channel of LTE/LTE-A. The control information for wireless optical communication may include information about whether mode 0 is used for the desired signal.

5.1.2.4. The transmitter transmits the desired signal using mode 0.

The receiver may directly determine whether mode 0 is used. The receiver may determine whether mode 0 is used and transmit and/or feed back information about activation and/or deactivation of a phase mask to the transmitter. The transmitter may transmit the desired signal to the receiver using mode 0 based on the received information.

Mode 0 means a Gaussian beam in which a phasefront has an isophase in the case of an LG beam. Since the Gaussian beam has the same phasefront characteristics as sunlight, it is difficult to distinguish between a desired signal and an interference signal. However, since there is a low necessity to distinguish between the desired signal and the interference signal when interference is equal to or less than a threshold, the Gaussian beam may be used.

Implementation Example

Embodiments may be implemented by organically combining one or more of the operations described above.

Figure 55:
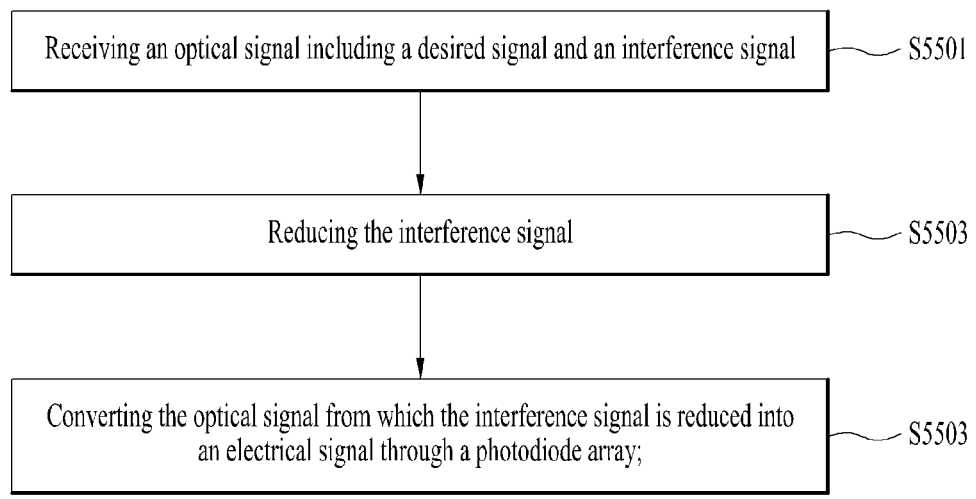
FIG. 55 illustrates a flowchart according to an embodiment of the present disclosure.

One of the embodiments that may be implemented by a combination of the above-described operations may be as illustrated in FIG. 55. An entity performing the operation of FIG. 55 may be the receiver described in the present specification, and the receiver may include the BS and/or the UE illustrated in FIG. 1. In FIG. 55, the receiver may be referred to as a first communication device, and the transmitter may be referred to as a second communication device.

The first communication device may receive an optical signal including a desired signal and an interference signal (S6501), reduce the interference signal (S6503), and convert the optical signal in which the interference signal is reduced into an electrical signal through a PD array.

The interference signal may be reduced through a first optical filter (Q1 plane) on which the optical signal is incident and a second optical filter (Q2 plane) on which the optical signal passing through the first optical filter is incident, the first and second optical filters having the structure illustrated in FIG. 35. As described in relation to FIG. 45, the interference signal may be reduced based on the length D1 of the first optical filter, the length D2 of the second optical filter, the focal length F1 between the first optical filter and the second optical filter, the distance F2 between the second optical filter and the PD array, and/or the length Dp of the PD array. The first optical filter and the second optical filter may be square or circular. When the first optical filter and the second optical filter are circular, the lengths D1 and D2 may correspond to diameters of the filters. D1, D2, F1, F2, and/or Dp may be determined in consideration of a wavelength of the desired signal, an interference level, and/or a distance between the first communication device and the second communication device.

The first communication device may further include one or more optical filters in addition to the first optical filter and the second optical filter. The first optical filter, the second optical filter, and/or the one or more optical filters may be enabled or disabled based on the interference level.

As described in Section 5.1, when the interference level of the interference signal is equal to or less than the threshold, a first mode may be applied to the desired signal. The first mode corresponds to mode 0 described in Section 5.1. Therefore, since the need for reducing interference is low when interference is low, i.e., the interference level is equal to or less than the threshold, a certain light intensity or more of the desired signal is located within a certain distance from the center of the PD array based on application of the first mode.

Calculation and resource use of the transmitter/receiver may be performed more efficiently by dynamically determining whether the optical filter is used and/or whether mode 0 is used based on the interference level.

The method and entity for measuring the interference level may be as described in Section 5.1. For example, interference may be measured by a method of recognizing the optical source around the transmitter/receiver link in terms of energy detection. Interference may be (i) measured by the first communication device or (ii) measured by the second communication device and received by the first communication device. Information about whether mode 0 is used may be (i) transmitted by a communication method other than wireless optical communication, or (ii) broadcast through wireless optical communication.

Among optical signals reaching a PD, an area converted into an electrical signal corresponds to the valid area as described in Section 4.1. The valid area may be configured according to one of the methods described in Section 4.1. For example, the valid area of the PD array includes a PD having an irradiance power P_irr equal to or greater than a second threshold, and an optical signal arriving at a PD included in the valid area may be converted into the electrical signal. The second threshold may be configured based on the greatest irradiance power measured in the PD array.

In addition to the operations of FIG. 55 described above, one or more of the operations described with reference to FIGS. 1 to 54 may be combined and additionally performed.

The wireless optical communication described through the present specification may be applied to various fields such as artificial intelligence, robots, and autonomous driving vehicles.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is industrially applicable to various wireless communication systems such as 3GPP LTE/LTE-A and 5G systems.

The invention claimed is:

1. A method of transmitting and receiving a signal by a first communication device in wireless optical communication, the method comprising:
receiving an optical signal including a desired signal and an interference signal;
reducing the interference signal; and
converting the optical signal in which the interference signal is reduced into an electrical signal through a photodiode array;
wherein the interference signal is reduced through a first optical filter on which the optical signal is incident and a second optical filter on which the optical signal passing through the first optical filter is incident,
wherein the interference signal is reduced based on at least one of a length D1 of the first optical filter, a length D2 of the second optical filter, a focal length F1 between the first optical filter and the second optical filter, a distance F2 between the second optical filter and the photodiode array, and/or a length Dp of the photodiode array,
wherein the desired signal includes a physical downlink control channel (PDCCH), a physical uplink control channel (PUCCH), a physical downlink shared channel (PDSCH) or physical uplink shared channel (PUSCH),
wherein the PDCCH includes downlink control information (DCI), wherein the DCI includes information about cell configuration, downlink scheduling, or uplink grant, and
wherein the PUCCH includes uplink control information (UCI), and the UCI includes acknowledgement, negative acknowledgement, channel state information (CSI), or scheduling request (SR).

2. The method of claim 1,
wherein D1, D2, F1, F2, and/or Dp is determined in consideration of a wavelength of the desired signal, an interference level, and/or a distance between the first communication device and a second communication device.

3. The method of claim 1,
wherein the first communication device further includes one or more optical filters in addition to the first optical filter and the second optical filter.

4. The method of claim 3,
wherein the first optical filter, the second optical filter, and/or the one or more optical filters are enabled or disabled based on an interference level.

5. The method of claim 1,
wherein a first mode is applied to the desired signal based on an interference level of the interference signal being equal to or less than a threshold, and
a certain light intensity or more of the desired signal is located within a certain distance from a center of the photodiode array based on application of the first mode.

6. The method of claim 5,
wherein information about whether the first mode is applied is (i) transmitted by a communication method other than the wireless optical communication or (ii) broadcast through the wireless optical communication.

7. The method of claim 1,
wherein a valid area of the photodiode array includes a photodiode having an irradiance power equal to or greater than a second threshold, and
wherein an optical signal arriving at a photodiode included in the valid area is converted into the electrical signal.

8. The method of claim 7,
wherein the second threshold is set based on a greatest irradiance power measured in the photodiode array.

9. A first communication device for transmitting and receiving a signal in a wireless optical communication system, the first communication device comprising:
at least one transceiver;
at least one processor; and
at least one memory operably connected to the at least one processor and configured to store instructions causing, when executed, the at least one processor to perform a specific operation,
wherein the specific operation comprises
receiving an optical signal including a desired signal and an interference signal,
reducing the interference signal, and
converting the optical signal in which the interference signal is reduced into an electrical signal through a photodiode array,
wherein the transceiver includes a first optical filter on which the optical signal is incident and a second optical filter on which the optical signal passing through the first optical filter is incident,
wherein the interference signal is reduced through the first optical filter and the second optical filter,
wherein the interference signal is reduced based on at least one of a length D1 of the first optical filter, a length D2 of the second optical filter, a focal length F1 between the first optical filter and the second optical filter, a distance F2 between the second optical filter and the photodiode array, and/or a length Dp of the photodiode array,
wherein the desired signal includes a physical downlink control channel (PDCCH), a physical uplink control channel (PUCCH), a physical downlink shared channel (PDSCH) or physical uplink shared channel (PUSCH),
wherein the PDCCH includes downlink control information (DCI), wherein the DCI includes information about cell configuration, downlink scheduling, or uplink grant, and
wherein the PUCCH includes uplink control information (UCI), and the UCI includes acknowledgement, negative acknowledgement, channel state information (CSI), or scheduling request (SR).

10. The first communication device of claim 9,
wherein D1, D2, F1, F2, and/or Dp is determined in consideration of a wavelength of the desired signal, an interference level, and/or a distance between the first communication device and a second communication device.

11. The first communication device of claim 9,
wherein a first mode is applied to the desired signal based on an interference level of the interference signal being equal to or less than a threshold, and
a certain light intensity or more of the desired signal is located within a certain distance from a center of the photodiode array based on application of the first mode.

12. The first communication device of claim 9,
wherein a valid area of the photodiode array includes a photodiode having an irradiance power equal to or greater than a second threshold, and wherein an optical signal arriving at a photodiode included in the valid area is converted into the electrical signal.

13. The first communication device of claim 12,
wherein the second threshold is set based on a greatest irradiance power measured in the photodiode array.

* * * * *